US012379535B2

(12) United States Patent
Ikeda

(10) Patent No.: US 12,379,535 B2
(45) Date of Patent: *Aug. 5, 2025

(54) DISPLAY MEDIUM, DISPLAY PRODUCT, AND DISPLAY SET

(71) Applicant: ZEON CORPORATION, Tokyo (JP)

(72) Inventor: Akira Ikeda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 644 days.

This patent is subject to a terminal disclaimer.

(21) Appl. No.: 17/753,822

(22) PCT Filed: Sep. 15, 2020

(86) PCT No.: PCT/JP2020/034930
§ 371 (c)(1),
(2) Date: Mar. 16, 2022

(87) PCT Pub. No.: WO2021/065484
PCT Pub. Date: Apr. 8, 2021

(65) Prior Publication Data
US 2022/0357585 A1   Nov. 10, 2022

(30) Foreign Application Priority Data
Sep. 30, 2019   (JP) .................................. 2019-180438

(51) Int. Cl.
*G02B 27/28* (2006.01)
*G02B 5/30* (2006.01)
*B42D 25/364* (2014.01)

(52) U.S. Cl.
CPC .......... *G02B 5/3016* (2013.01); *B42D 25/364* (2014.10); *G02B 27/283* (2013.01)

(58) Field of Classification Search
CPC .. G02B 5/3016; G02B 27/283; G02B 5/3025; G02B 5/3083; G02B 5/30; B42D 25/364; G09F 19/12
See application file for complete search history.

(56) References Cited

U.S. PATENT DOCUMENTS

| 6,061,122 A | 5/2000 | Hoshino et al. |
| 6,217,792 B1 | 4/2001 | Parri et al. |
(Continued)

FOREIGN PATENT DOCUMENTS

| EP | 1748306 A1 | 1/2007 |
| EP | 3351980 A1 | 7/2018 |
(Continued)

OTHER PUBLICATIONS

Aug. 11, 2020, International Search Report issued in the International Patent Application No. PCT/JP2020/022170.
(Continued)

*Primary Examiner* — Elmito Breval
(74) *Attorney, Agent, or Firm* — KENJA IP LAW PC

(57) ABSTRACT

A display medium comprises a substrate having first and second surfaces, and a reflective layer on at least one of the first and second surfaces. The substrate includes a polarized light separation layer capable of reflecting circularly polarized light having one rotation direction DA and transmitting circularly polarized light having an opposite rotation direction to the rotation direction DA therethrough. The reflective layer contains first and second reflective pigments capable of reflecting circularly polarized light having rotation directions DBR and DBL, respectively, and transmitting circularly polarized light having opposite rotation directions to the rotation directions DBR and DBL, respectively, therethrough. The rotation directions DBR and DBL of the circularly polarized light that the first and second reflective pigments, respectively, can reflect are opposite to each other.

(Continued)

Hues of the circularly polarized light that the first and second reflective pigments can reflect are differ from each other.

4 Claims, 13 Drawing Sheets

(56) References Cited

U.S. PATENT DOCUMENTS

| | | |
|---|---|---|
| 6,468,444 B1 | 10/2002 | Meyer et al. |
| 2003/0137632 A1 | 7/2003 | Kawabata |
| 2004/0247825 A1 | 12/2004 | Faris et al. |
| 2006/0257586 A1 | 11/2006 | Umeya |
| 2007/0159671 A1 | 7/2007 | Hoshino et al. |
| 2008/0129036 A1 | 6/2008 | Seki et al. |
| 2008/0282322 A1 | 11/2008 | Saito |
| 2010/0134724 A1 | 6/2010 | Arakawa et al. |
| 2014/0022493 A1 | 1/2014 | Hoshino et al. |
| 2015/0285979 A1 | 10/2015 | Aimatsu |
| 2016/0245972 A1 | 8/2016 | Yamanaka et al. |
| 2018/0143363 A1 | 5/2018 | Ichihashi et al. |
| 2019/0187351 A1 | 6/2019 | Yamanaka et al. |
| 2019/0243043 A1* | 8/2019 | Inada .................. G09F 19/12 |
| 2020/0264358 A1 | 8/2020 | Kawabata |

FOREIGN PATENT DOCUMENTS

| | | |
|---|---|---|
| JP | H0672962 A | 3/1994 |
| JP | 2000255200 A | 9/2000 |
| JP | 2000290315 A | 10/2000 |
| JP | 2001004829 A | 1/2001 |
| JP | 2003066214 A | 3/2003 |
| JP | 2003145912 A | 5/2003 |
| JP | 2003195045 A | 7/2003 |
| JP | 2003313187 A | 11/2003 |
| JP | 2003342219 A | 12/2003 |
| JP | 2004115414 A | 4/2004 |
| JP | 2004341417 A | 12/2004 |
| JP | 3652476 B2 | 5/2005 |
| JP | 2005289881 A | 10/2005 |
| JP | 2006317656 A | 11/2006 |
| JP | 2007057971 A | 3/2007 |
| JP | 2007093675 A | 4/2007 |
| JP | 2007094625 A | 4/2007 |
| JP | 2007141117 A | 6/2007 |
| JP | 2007176870 A | 7/2007 |
| JP | 2007216602 A | 8/2007 |
| JP | 2008197223 A | 8/2008 |
| JP | 2008203801 A | 9/2008 |
| JP | 4172199 B2 | 10/2008 |
| JP | 2009166319 A | 7/2009 |
| JP | 2009288312 A | 12/2009 |
| JP | 2009300662 A | 12/2009 |
| JP | 2010111104 A | 5/2010 |
| JP | 2010196005 A | 9/2010 |
| JP | 2010275452 A | 12/2010 |
| JP | 2014076583 A | 5/2014 |
| JP | 2014141057 A | 8/2014 |
| JP | 2014174471 A | 9/2014 |
| JP | 2014174472 A | 9/2014 |
| JP | 2015027743 A | 2/2015 |
| JP | 5828182 B2 | 12/2015 |
| JP | 6142714 B2 | 6/2017 |
| JP | 2017185668 A | 10/2017 |
| JP | 2017215580 A | 12/2017 |
| JP | 2017219760 A | 12/2017 |
| WO | 9800428 A1 | 1/1998 |
| WO | 2004032099 A1 | 4/2004 |
| WO | 2007007784 A1 | 1/2007 |
| WO | 2007018258 A1 | 2/2007 |
| WO | 2014069515 A1 | 5/2014 |
| WO | 2015064581 A1 | 5/2015 |
| WO | 2016043219 A1 | 3/2016 |
| WO | 2016056617 A1 | 4/2016 |
| WO | 2018034215 A1 | 2/2018 |
| WO | 2018079130 A1 | 5/2018 |
| WO | 2019059067 A1 | 3/2019 |

OTHER PUBLICATIONS

Aug. 7, 2023, the Extended European Search Report issued by the European Patent Office in the corresponding European Patent Application No. 20847513.7.
Dec. 28, 2021, International Preliminary Report on Patentability issued in the International Patent Application No. PCT/JP2020/022170.
Feb. 1, 2022, International Preliminary Report on Patentability issued in the International Patent Application No. PCT/JP2020/026100.
Feb. 26, 2024, Office Action issued by the United States Patent and Trademark Office in the U.S. Appl. No. 17/596,908.
Jun. 26, 2023, the Extended European Search Report issued by the European Patent Office in the European Patent Application No. 20832349.3.
May 22, 2024, Office Action issued by the United States Patent and Trademark Office in the U.S. Appl. No. 17/597,099.
Nov. 17, 2023, Office Action issued by the United States Patent and Trademark Office in the U.S. Appl. No. 17/596,908.
Sep. 8, 2020, International Search Report issued in the International Patent Application No. PCT/JP2020/026100.
Dec. 1, 2020, International Search Report issued in the International Patent Application No. PCT/JP2020/034930.
Apr. 5, 2022, International Preliminary Report on Patentability issued in the International Patent Application No. PCT/ JP2020/ 034930.
Oct. 12, 2023, the Extended European Search Report issued by the European Patent Office in the corresponding European Patent Application No. 20871775.1.

* cited by examiner

DISPLAY MEDIUM, DISPLAY PRODUCT, AND DISPLAY SET

TECHNICAL FIELD

The present invention relates to a display medium, a display article to be observed through the display medium, and a display set including these in combination.

BACKGROUND ART

A circular polarizing plate generally has a function of selectively transmitting either circularly polarized light (that is, clockwise circularly polarized light) which has a clockwise rotation direction or circularly polarized light (that is, counterclockwise circularly polarized light) which has a counterclockwise rotation direction therethrough. By utilizing such a function, the circular polarizing plate has conventionally been used for application of authenticity identification (Patent Literatures 1 and 2).

CITATION LIST

Patent Literature

Patent Literature 1: Japanese Patent No. 4172199
Patent Literature 2: Japanese Patent No. 5828182

SUMMARY OF THE INVENTION

Technical Problem

The present inventor has considered that the above-mentioned function of the circular polarizing plate can be utilized for application other than in authenticity identification, and has attempted to create a novel display mode.

The present invention has been made in view of the above-mentioned problems, and an object of the present invention is to provide a display set that can achieve a novel display mode that, as of now, has not yet been achieved, as well as a display medium and a display article that can be applied to the display set.

Solution to Problem

The present inventor intensively conducted research for solving the above-mentioned problems. As the result, the present inventor has found that the above-mentioned problems can be solved by a display set including, in combination: a display medium which includes a substrate including a polarized light separation layer which has a circularly polarized light separation function, and a reflective layer which contains two or more types of pigment each having a circularly polarized light separation function; and a display article which includes a foundation article, and a display layer which contains a pigment having a circularly polarized light separation function. Thus, the present invention has been accomplished.

That is, the present invention includes the following.

<1> A display medium comprising a substrate, and a reflective layer provided on the substrate, wherein:
the substrate includes a polarized light separation layer capable of reflecting circularly polarized light having one rotation direction $D_A$ and transmitting circularly polarized light having an opposite rotation direction to the rotation direction $D_A$ therethrough;
the reflective layer contains a first reflective pigment capable of reflecting circularly polarized light having one rotation direction $D_{BR}$ and transmitting circularly polarized light having an opposite rotation direction to the rotation direction $D_{BR}$ therethrough, and a second reflective pigment capable of reflecting circularly polarized light having one rotation direction $D_{BL}$ and transmitting circularly polarized light having an opposite rotation direction to the rotation direction $D_{BL}$ therethrough;
the rotation direction $D_{BR}$ of the circularly polarized light that the first reflective pigment can reflect is opposite to the rotation direction $D_{BL}$ of the circularly polarized light that the second reflective pigment can reflect; and
a hue of the circularly polarized light that the first reflective pigment can reflect and a hue of the circularly polarized light that the second reflective pigment can reflect differ from each other.

<2> The display medium according to <1>, wherein a wavelength width of a wavelength range over which the polarized light separation layer can reflect circularly polarized light is 70 nm or wider.

<3> The display medium according to <1> or <2>, wherein the polarized light separation layer is a layer of a resin which has cholesteric regularity.

<4> The display medium according to any one of <1> to <3>, wherein the first reflective pigment and the second reflective pigment contain a flake of a resin which has cholesteric regularity.

<5> The display medium according to any one of <1> to <4>, wherein the substrate includes a phase difference layer.

<6> The display medium according to <5>, wherein an in-plane retardation of the phase difference layer at a measurement wavelength of 590 nm is equal to or more than "$\{(2n+1)/2\} \times 590$ nm$-30$ nm" and equal to or less than "$\{(2n+1)/2\} \times 590$ nm$+30$ nm" (provided that n is an integer of 0 or larger).

<7> A display article to be observed through the display medium according to any one of <1> to <6>, wherein
the display article comprises a foundation article and a display layer provided on the foundation article; and
the display layer contains a display pigment capable of reflecting circularly polarized light having one rotation direction $D_D$ and transmitting circularly polarized light having an opposite rotation direction to the rotation direction $D_D$ therethrough.

<8> The display article according to <7>, wherein:
the display layer contains, as the display pigment, a first display pigment capable of reflecting circularly polarized light having one rotation direction $D_{DR}$ and transmitting circularly polarized light having an opposite rotation direction to the rotation direction $D_{DR}$ therethrough, and a second display pigment capable of reflecting circularly polarized light having one rotation direction $D_{DL}$ and transmitting circularly polarized light having an opposite rotation direction to the rotation direction $D_{DL}$ therethrough;
the rotation direction $D_{DR}$ of the circularly polarized light that the first display pigment can reflect is opposite to the rotation direction $D_{DL}$ of the circularly polarized light that the second display pigment can reflect; and
a hue of the circularly polarized light that the first display pigment can reflect and a hue of the circularly polarized light that the second display pigment can reflect differ from each other.

<9> A display set comprising:
the display medium according to any one of <1> to <6>; and
the display article according to <7> or <8>.

<10> A display article to be observed through a display medium including a substrate, which includes a polarized light separation layer and a phase difference layer, the polarized light separation layer being capable of reflecting circularly polarized light having one rotation direction $D_A$ and transmitting circularly polarized light having an opposite rotation direction to the rotation direction $D_A$ therethrough, wherein
the display article comprises a foundation article and a display layer provided on the foundation article;
the display layer contains a first display pigment capable of reflecting circularly polarized light having one rotation direction $D_{DR}$ and transmitting circularly polarized light having an opposite rotation direction to the rotation direction $D_{DR}$ therethrough, and a second display pigment capable of reflecting circularly polarized light having one rotation direction $D_{DL}$ and transmitting circularly polarized light having an opposite rotation direction to the rotation direction $D_{DL}$ therethrough;
the rotation direction $D_{DR}$ of the circularly polarized light that the first display pigment can reflect is opposite to the rotation direction $D_{DL}$ of the circularly polarized light that the second display pigment can reflect; and
a hue of the circularly polarized light that the first display pigment can reflect and a hue of the circularly polarized light that the second display pigment can reflect differ from each other.

<11> A display set comprising:
a display medium including a substrate, which includes a polarized light separation layer and a phase difference layer, the polarized light separation layer being capable of reflecting circularly polarized light having one rotation direction $D_A$ and transmitting circularly polarized light having an opposite rotation direction to the rotation direction $D_A$ therethrough; and
the display article according to <10>.

Advantageous Effects of Invention

According to the present invention, it is possible to provide a display set that can achieve a novel display mode that, as of now, has not yet been achieved, and a display medium and a display article that can be applied to the display set.

DESCRIPTION OF EMBODIMENTS

Figure 1:
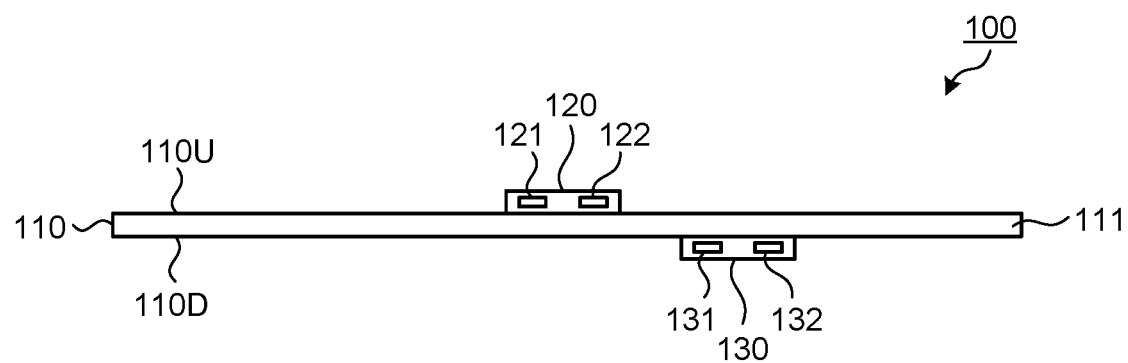
FIG. 1 is a cross-sectional view schematically illustrating a display medium according to a first embodiment of the present invention.

Hereinafter, the present invention will be described in detail with reference to embodiments and examples. However, the present invention is not limited to the embodiments and examples described hereinafter, and may be freely modified for implementation without departing from the scope of claims of the present invention and the scope of their equivalents.

In the following description, an in-plane retardation Re of a layer is a value represented by $Re=(nx-ny) \times d$ unless otherwise specified. Herein, nx represents a refractive index in a direction in which the maximum refractive index is given among directions (in-plane directions) perpendicular to the thickness direction of the layer, ny represents a refractive index in a direction, among the above-mentioned in-plane directions of the layer, perpendicular to the direction giving nx, and d represents the thickness of the layer. The measurement wavelength is 590 nm unless otherwise specified.

In the following description, the term "circularly polarized light" includes elliptically polarized light within a range in which the advantageous effects of the present invention are not significantly impaired.

1. Summary of Display Set

A display set according to an embodiment of the present invention includes a display medium and a display article. The display medium includes a substrate including a polarized light separation layer, and a reflective layer provided on the substrate. Usually, the substrate is a member having a first surface and a second surface located opposite to the first surface, and the reflective layer is provided on at least one of the first surface and the second surface. The display article includes a foundation article, and a display layer provided on the foundation article.

The substrate included in the display medium can transmit part of irradiation light such as unpolarized light containing both clockwise rotating circularly polarized light (i.e., clockwise circularly polarized light) and counterclockwise rotating circularly polarized light (i.e., counterclockwise circularly polarized light) therethrough. Specifically, the polarized light separation layer included in the substrate may reflect circularly polarized light having a rotation direction $D_A$ that is one of the clockwise and counterclockwise rotation directions, and transmit circularly polarized light having an opposite rotation direction to the rotation direction $D_A$ therethrough. Thus, the substrate may be a member transparent or semi-transparent to the irradiation light.

Furthermore, the reflective layer included in the display medium contains a plurality of pigments capable of reflecting circularly polarized light having a rotation direction $D_B$ that is one of the clockwise and counterclockwise rotation directions, and transmitting circularly polarized light having an opposite rotation direction to the rotation direction $D_B$ therethrough. Hereinafter, such a pigment contained in the reflective layer may be referred to as a "reflective pigment". As such a reflective pigment, the reflective layer contains, in combination, a first reflective pigment capable of reflecting circularly polarized light having one rotation direction $D_{BR}$, and a second reflective pigment capable of reflecting circularly polarized light having an opposite rotation direction $D_{BL}$ to the rotation direction $D_{BR}$. The first reflective pigment and the second reflective pigment are combined so that the hues of the circularly polarized light that these reflective pigments can reflect differ from each other. In the following description, the hue of circularly polarized light that a reflective pigment can reflect may be referred to as the "hue of the reflective pigment". Accordingly, the hue of the circularly polarized light that the first reflective pigment can reflect may be referred to as the "hue of the first reflective pigment". The hue of the circularly polarized light that the second reflective pigment can reflect may be referred to as the "hue of the second reflective pigment".

When the display medium is observed from a side with the reflective layer, an observer usually sees reflected light which has been incident on the reflective layer and reflected without being transmitted through the substrate. In the reflective layer, high intensity light reflection may occur both in the first reflective pigment and the second reflective pigment. The reflected light from the reflective layer may therefore include, in combination, circularly polarized light which has been reflected by the first reflective pigment and has the rotation direction $D_{BR}$, and circularly polarized light which has been reflected by the second reflective pigment and has the rotation direction $D_{BL}$. Thus, the observer can visually recognize the reflective layer which exhibits a color that is a mixture of the hue of the first reflective pigment and the hue of the second reflective pigment.

When the display medium is observed from a side opposite to the reflective layer, the observer usually sees reflected light which has been transmitted through the substrate, incident on the reflective layer and then reflected. Since the polarized light separation layer of the substrate reflects circularly polarized light having a rotation direction $D_A$ that is one of the clockwise and counterclockwise rotation directions, the circularly polarized light reflected by the substrate cannot enter the reflective layer. Thus, in one of the reflective pigment capable of reflecting clockwise circularly polarized light and the reflective pigment capable of reflecting counterclockwise circularly polarized light in the reflective layer, no light reflection occurs, or the reflection intensity is low. Therefore, of the circularly polarized light having the rotation direction $D_{BR}$ and the circular polarized light having the rotation direction $D_{BL}$, one is not included in the reflected light from the reflective layer, or the light flux of such circularly polarized light is small even if included. Thus, the observer can visually recognize the reflective layer which exhibits a color that is either the hue of a first reflective layer or the hue of a second reflective layer.

Thus, in a case where the display medium is observed under light which includes both clockwise circularly polarized light and counterclockwise circularly polarized light, the hue of the reflective layer which can be visually recognized when observed from the side with the reflective layer and the hue of the reflective layer which can be visually recognized when observed from the side opposite to the reflective layer may differ from each other. Thus, the image of the display medium which can be visually recognized when observed from one surface (for example, a front surface), and the image of the display medium which can be visually recognized when observed from the other surface (for example, a rear surface) may differ from each other even though the substrate is transparent or semi-transparent.

Since the substrate is transparent or semi-transparent under irradiation light including both clockwise circularly polarized light and counterclockwise circularly polarized light as described above, at least part of the display medium may be transparent or semi-transparent. The observer can therefore observe the display article through the display medium.

The display layer of the display article contains a pigment capable of reflecting circularly polarized light having a rotation direction $D_D$ that is one of the clockwise and counterclockwise rotation directions, and transmitting circularly polarized light having an opposite rotation direction to the rotation direction $D_D$ therethrough. Hereinafter, such a pigment contained in the display layer may be referred to as a "display pigment". The circularly polarized light reflected by such a display pigment may be blocked by the substrate of the display medium. Thus, the image of the display article which can be visually recognized when observed through the display medium may differ from the image of the display article which can be visually recognized when observed without the interposition of the display medium.

In a case where the display layer contains, as the display pigment, a first display pigment capable of reflecting circularly polarized light having one rotation direction $D_{DR}$, and a second display pigment capable of reflecting circularly polarized light having an opposite rotation direction $D_{DL}$ to the rotation direction $D_{DR}$ in combination, for example, the color of the display layer which can be visually recognized when observed without the interposition of the display medium may be a mixed color of the hue of the circularly polarized light reflected by the first display pigment and the hue of the circularly polarized light reflected by the second display pigment. The color of the display layer which can be visually recognized when observed through the display medium, on the other hand, may be that of the hue of circularly polarized light that is not blocked by the substrate of the display medium. The color of the display layer which can be visually recognized when observed through the display medium may therefore be either the hue of the circularly polarized light reflected by the first display pigment, or the hue of the circularly polarized light reflected by the second display pigment. Thus, the hue of the display layer which appears in the visually recognized image of the display article may vary. The image of the display article which can be visually recognized when observed through the display medium and the image of the display article which can be visually recognized when observed without the interposition of the display medium may therefore differ from each other. In the following description, the hue of circularly polarized light that a display pigment can reflect may be referred to as the "hue of the display pigment". Accordingly, the hue of the circularly polarized light that the first display pigment can reflect may be referred to as the "hue of the first display pigment". Also, the hue of the circularly polarized light that the second display pigment can reflect may be referred to as the "hue of the second display pigment".

When the substrate includes a phase difference layer, in particular, the visually recognized color of the display layer may be changed depending on the direction of the display medium. Since the phase difference layer changes the polarization state of light which has been transmitted through the phase difference layer, the rotation direction of circularly polarized light to be blocked by the substrate may differ depending on a traveling direction of the circularly polarized light. For example, when clockwise circularly polarized light irradiated onto one surface of the substrate including the phase difference layer is blocked by the substrate, this substrate can block counterclockwise circularly polarized light irradiated onto the other surface of the substrate. Accordingly, in the display medium, circularly polarized light to be blocked can be switched between clockwise circularly polarized light and counterclockwise circularly polarized light depending on the direction of the display medium, the front facing direction or the back facing direction. The color of the display layer which can be visually recognized when observed through the display medium can therefore be changed between that of the hue of the first display pigment and that of the hue of the second display pigment depending on the direction of the display medium. Thus, the image of the display article which can be visually recognized when observed through the display medium may vary depending on the direction of the display medium.

As just described, the visually recognized image of the display medium may vary depending on the direction of the display medium in the display set according to an embodiment of the present invention. Moreover, the image of the display article which can be visually recognized when observed through the display medium may differ from the image of the display article which can be visually recognized when observed without the interposition of the display medium. Furthermore, when the substrate of the display medium includes the phase difference layer, in particular, the image of the display article which can be visually recognized when observed through the display medium may vary depending on the direction of the display medium. Hence, by utilizing a combination of such different images, a complementary design can be accomplished, a novel display mode that has not yet been achieved can be achieved, and a complex and highly-flexible design can be produced.

When the substrate of the display medium includes the phase difference layer as described above, the image of the display article which can be visually recognized when observed through the display medium may vary depending on the direction of the display medium. Thus, a complementary design can be accomplished also by combining images of the display article to be visually recognized regardless of the reflective layer of the display medium. In view of this, a display set including: a display medium which includes a substrate including a polarized light separation layer and a phase difference layer; and a display article which includes a display layer which contains a first display pigment and a second display pigment in combination may be implemented as another embodiment of the present invention. In this display set, the display medium may include no reflective layer, and may contain only a reflective pigment capable of reflecting circularly polarized light having one of clockwise and counterclockwise rotation directions. Moreover, the first display pigment and the second display pigment contained in the display layer of the display article are preferably combined so that the hue of the first display pigment and the hue of the second display pigment differ from each other.

2. First Embodiment of Display Medium

Figure 2:
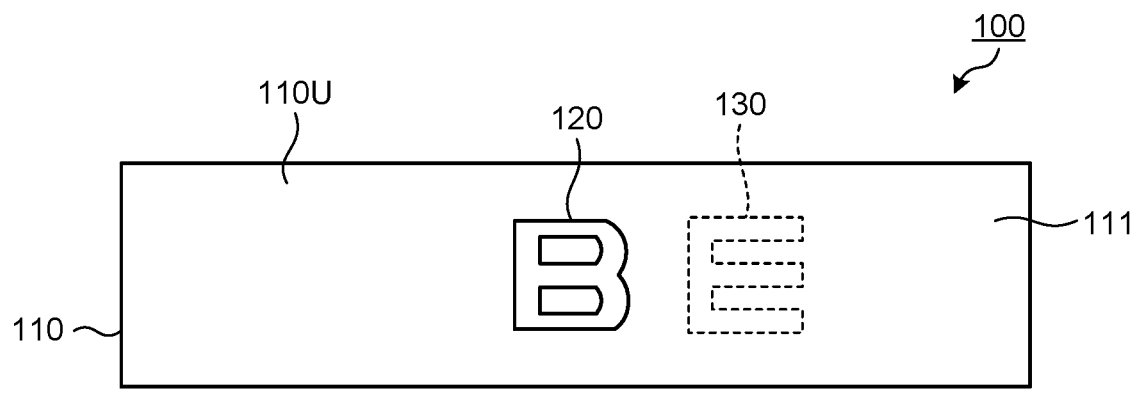
FIG. 2 is a schematic plan view of the display medium according to the first embodiment of the present invention as viewed from one side.
Figure 3:
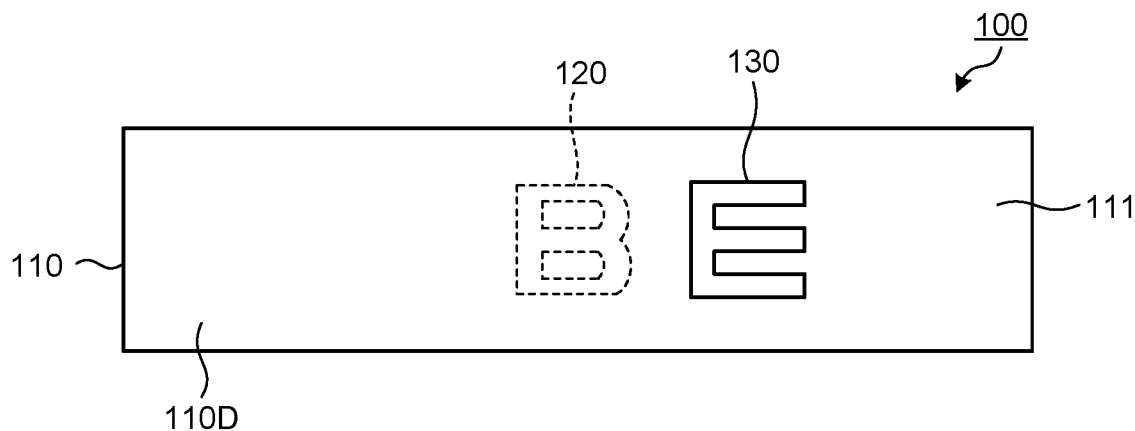
FIG. 3 is a schematic plan view of the display medium according to the first embodiment of the present invention as viewed from the other side.

FIG. 1 is a cross-sectional view schematically illustrating a display medium 100 according to a first embodiment of the present invention. FIG. 2 is a schematic plan view illustrating the display medium 100 according to the first embodiment of the present invention as viewed from one side (the side where a first reflective layer 120 is provided). FIG. 3 is a schematic plan view illustrating the display medium 100 according to the first embodiment of the present invention as viewed from the other side (the side where a second reflective layer 130 is provided).

As illustrated in FIGS. 1 to 3, the display medium 100 according to the first embodiment of the present invention includes: a substrate 110 which has a first surface 110U and a second surface 110D; the first reflective layer 120 provided, as a reflective layer, on the first surface 110U of the substrate 110; and the second reflective layer 130 provided, as a reflective layer, on the second surface 110D of the substrate 110.

The substrate 110 is a member which has the first surface 110U, and the second surface 110D opposite to the first surface 110U, and includes a polarized light separation layer 111. In the present embodiment, a description will be given of, as an example, the sheet-shape substrate 110 which has the first surface 110U as one of the front surface and the rear surface and also has the second surface 110D as the other one of the front surface and the rear surface.

The polarized light separation layer 111 has a circularly polarized light separation function. The "circularly polarized light separation function" refers to a function of reflecting circularly polarized light having either a clockwise rotation direction or a counterclockwise rotation direction and transmitting circularly polarized light having the opposite rotation direction thereto. Therefore, the polarized light separation layer 111 can reflect circularly polarized light having one rotation direction $D_A$ and can transmit circularly polarized light having the opposite rotation direction to the rotation direction $D_A$ therethrough, in a wavelength range over which the polarized light separation layer 111 can exhibit the circularly polarized light separation function. The wavelength range over which the polarized light separation layer 111 can exhibit the circularly polarized light separation function specifically refers to a wavelength range at the full width at half maximum of a peak having, in a reflection spectrum measured at an incidence angle of 5°, a maximum reflectivity (the maximum strength of the spectrum) of usually 35% to 50%, preferably 40% to 50% (i.e., a wavelength range indicating a strength equal to or more than "the minimum strength+(the maximum strength−the minimum strength)/2" in the aforementioned reflection spectrum). In the following description, such a wavelength range over which the polarized light separation layer 111 can exhibit the circularly polarized light separation function may be referred to as a "polarized light separation wavelength range" as appropriate.

From the viewpoint of achieving a display mode that can be visually recognized with the naked eye, the polarized light separation wavelength range is preferably in a visible wavelength range. The visible wavelength range usually refers to a wavelength range from 400 nm to 780 nm.

The wavelength width of the polarized light separation wavelength range is preferably wide. A specific wavelength width of the polarized light separation wavelength range is preferably 70 nm or wider, more preferably 100 nm or wider, still more preferably 200 nm or wider, and particularly preferably 400 nm or wider. In a case where the wavelength width of the polarized light separation wavelength range is wide, the color range of circularly polarized light that the polarized light separation layer 111 can reflect can be broadband. In this case, the flexibility, in terms of color, of the reflective layer such as the first reflective layer 120 and the second reflective layer 130, and a display layer (not illustrated in FIGS. 1 to 3) of a display article can be enhanced, and a display mode with advanced design can be achieved. The upper limit of the wavelength width of the polarized light separation wavelength range is not particularly limited, and may be 600 nm or narrower, for example. The wavelength width of the polarized light separation wavelength range can be measured with a method to be described in Examples.

As the polarized light separation layer 111, a layer of a resin which has cholesteric regularity is preferable. Hereinbelow, a resin which has cholesteric regularity may be referred to as a "cholesteric resin" as appropriate. The cholesteric regularity is a structure in which the angle of molecular axes in stacking planes are shifted (twisted) as the planes are observed sequentially passing through the stacked planes, such that molecular axes in a certain first plane are oriented in a certain direction, molecular axes in a subsequent plane stacking on the first plane are oriented in a direction shifted by a small angle with respected to that of the first plane, and molecular axes in still another plane are oriented in a direction of a further shifted angle. That is, when molecules inside a layer have cholesteric regularity, molecular axes of the molecules on a first plane inside the layer are aligned along a constant direction. On the subsequent second plane stacking on the first plane inside the layer, a direction of molecular axes is shifted by a slight angle from the direction of the molecular axes on the first plane. On the subsequent third plane further stacking on the second plane, a direction of molecular axes is further shifted by an angle from the direction of the molecular axes on the second plane. In this manner, on the planes disposed in a stacking manner, the angles of the molecular axes on these planes are sequentially shifted (twisted). The structure in which the directions of the molecular axes are twisted in this manner is usually a helical structure and is an optically chiral structure.

A layer of the cholesteric resin can usually exhibit the circularly polarized light separation function. The reflection by the layer of the cholesteric resin is reflection of circularly polarized light which maintains the chirality of the circularly polarized light.

The specific wavelength at which the layer of the cholesteric resin exerts the circularly polarized light separation function generally depends on a pitch of the helical structure in the layer of the cholesteric resin. The pitch of the helical structure is a distance in a plane normal direction, from the start of gradual shifting of the direction of molecular axes with an angle in the helical structure as proceeding through planes, to the return to the original direction of molecular axes. The size of this pitch of the helical structure can be adjusted to control a wavelength at which a circularly polarized light separation function is exerted. As a method for adjusting the pitch, a method described in Japanese Patent Application Laid-Open No. 2009-300662 A may be adopted, for example. Specific examples thereof may include a method of adjusting the type of a chiral agent and a method of adjusting the amount of the chiral agent, in a cholesteric liquid crystal composition. In particular, when the size of the pitch of the helical structure continuously varies within the layer, a single layer of the cholesteric resin can provide a circularly polarized light separation function over a wide range of wavelength.

Examples of the layer of the cholesteric resin that can exert the circularly polarized light separation function in a broad wavelength range may include (i) a layer of a cholesteric resin in which the size of the pitch of the helical structure is changed in a stepwise manner and (ii) a layer of a cholesteric resin in which the size of the pitch of the helical structure is changed continuously.

(i) The layer of the cholesteric resin in which the size of the pitch of the helical structure is changed in a stepwise manner can be obtained by stacking a plurality of layers of the cholesteric resin having different pitches of the helical structure, for example. After a plurality of layers of the cholesteric resin having different pitches of the helical structure have been produced in advance, stacking can be performed by bonding together the layers via a tackiness agent or an adhesive agent. Alternatively, the stacking can be performed by forming a layer of the cholesteric resin and then sequentially forming other layers of the cholesteric resin thereon.

(ii) The layer of the cholesteric resin in which the size of the pitch of the helical structure is changed continuously can be obtained by subjecting a layer of a liquid crystal composition to a bandwidth broadening treatment including one or more times of irradiation treatment with active energy ray and/or warming treatment and then curing the layer of the liquid crystal composition, for example. The aforementioned bandwidth broadening treatment can continuously change the pitch of the helical structure in the thickness direction, and the wavelength range (reflection bandwidth) in which the layer of the cholesteric resin can exert the circularly polarized light separation function can thus be broadened. For this reason, the treatment is called a bandwidth broadening treatment.

The layer of the cholesteric resin may be a layer having a single-layered structure that includes only one layer or a layer having a multilayered structure that includes two or more layers. From the viewpoint of facilitation of producing it, the number of layers included in the layer of the cholesteric resin is preferably 1 to 100 layers, and more preferably 1 to 20 layers.

The method for producing the layer of the cholesteric resin is not limited, and the layer of the cholesteric resin may generally be produced with the use of a cholesteric liquid crystal composition. The cholesteric liquid crystal composition refers to a composition in which a liquid crystal compound can exhibit a liquid crystal phase with cholesteric regularity (cholesteric liquid crystal phase) in a case where the liquid crystal compound contained in the liquid crystal composition is oriented. Herein, a material called "liquid crystal composition" for convenience includes not only a mixture of two or more substances but also a material consisting of a single substance. Specific examples of the method for producing a layer of the cholesteric resin may include methods described in Japanese Patent Application Laid-Open No. 2014-174471 A and Japanese Patent Application Laid-Open No. 2015-27743 A. In such production methods using a cholesteric liquid crystal composition, a twisting direction in cholesteric regularity can appropriately be selected depending on the structure of a chiral agent contained in the liquid crystal composition. For example, in a case where the twisting direction is to be a clockwise direction, a cholesteric liquid crystal composition containing a chiral agent for imparting dextrorotation may be used, and in a case where the twisting direction is to be a counterclockwise direction, a cholesteric liquid crystal composition containing a chiral agent for imparting levorotation may be used.

The thickness of the polarized light separation layer 111 is preferably 2 µm or more, and more preferably 3 µm or more, and is preferably 1,000 µm or less, and more preferably 500 µm or less. When the thickness of the polarized light separation layer 111 is equal to or more than the lower limit value of the aforementioned range, a difference between the image of the display medium 100 which can be visually recognized when observed from one side and the image of the display medium 100 which can be visually recognized when observed from the other side can be made notably clear. When the thickness of the polarized light separation layer 111 is equal to or less than the upper limit value of the aforementioned range, on the other hand, transparency can be enhanced.

The substrate 110 may include an optional layer (not illustrated) without significantly impairing the advantageous effects of the present invention. Examples of such an optional layer may include a supporting layer for supporting the polarized light separation layer 111, and an adhesion layer that causes adhesion between the polarized light separation layer 111 and another layer. These optional layers each preferably have a small in-plane retardation. A specific in-plane retardation of such an optional layer is preferably 20 nm or less, more preferably 10 nm or less, particularly preferably 5 nm or less, and ideally 0 nm. Since such a layer having a small in-plane retardation is an optically isotropic layer, the polarization state can be prevented from being changed due to the optional layer.

The first reflective layer 120 is provided, as a reflective layer, on the first surface 110U of the substrate 110. The first reflective layer 120 may be provided directly or indirectly on the first surface 110U of the substrate 110. The expression that a layer is "directly" provided on a certain surface means that no other layer is present between the surface and the layer. Also, the expression that a layer is "indirectly" provided on a certain surface means that another layer (such as an adhesion layer) is present between the surface and the layer.

The first reflective layer 120 may be provided on part of the first surface 110U of the substrate 110, or may be provided over the entire first surface 110U. The first reflective layer 120 is usually provided so as to overlap the polarized light separation layer 111 of the substrate 110 as viewed in the thickness direction thereof. That is, the position of the entire first reflective layer 120 and the position of part or the entirety of the polarized light separation layer 111 are usually the same as each other in in-plane directions perpendicular to the thickness direction of the display medium 100. Furthermore, the first reflective layer 120 may have a planar shape in accordance with the design of the display medium 100. In the present embodiment, a description will be given of, as an example, the first reflective layer 120 having a planar shape of a character "B" as illustrated in FIG. 2. In this example, the entire first reflective layer 120 overlaps part of the polarized light separation layer 111 of the substrate 110 as viewed in the thickness direction thereof.

The first reflective layer 120 contains a first reflective pigment 121 and a second reflective pigment 122 as illustrated in FIG. 1. Although only one first reflective pigment 121 and only one second reflective pigment 122 are illustrated in FIG. 1 for the purpose of illustration, the first reflective layer 120 may usually contain a plurality of first reflective pigments 121 and a plurality of second reflective pigments 122.

The first reflective pigment 121 has a circularly polarized light separation function. Thus, in a wavelength range over which the first reflective pigment 121 can exhibit the circularly polarized light separation function, the first reflective pigment 121 can reflect circularly polarized light having one rotation direction $D_{BR}$, and transmit circularly polarized light having an opposite rotation direction to the rotation direction $D_{BR}$ therethrough. In the following description, the rotation direction of circularly polarized light that the first reflective pigment 121 contained in the first reflective layer 120 can reflect is denoted by a symbol "$D_{BR1}$" as appropriate so as to be discriminated from the rotation direction of circularly polarized light that a first reflective pigment 131 contained in the second reflective layer 130 can reflect. The wavelength range over which each of reflective pigments such as the first reflective pigment 121 and the second reflective pigment 122, as well as the first reflective pigment 131 and a second reflective pigment 132 to be described later can exhibit the circularly polarized light separation function may be referred to as a "reflection wavelength range" as appropriate.

The second reflective pigment 122 has a circularly polarized light separation function. Thus, in a reflection wavelength range over which the second reflective pigment 122 exhibits the circularly polarized light separation function, the second reflective pigment 122 can reflect circularly polarized light having one rotation direction $D_{BL}$, and transmit circularly polarized light having an opposite rotation direction to the rotation direction $D_{BL}$ therethrough. In the following description, the rotation direction of circularly polarized light that the second reflective pigment 122 contained in the first reflective layer 120 can reflect is denoted by a symbol "$D_{BL1}$" as appropriate so as to be discriminated from the rotation direction of circularly polarized light that the second reflective pigment 132 contained in the second reflective layer 130 can reflect. In the present embodiment, the rotation direction $D_{BL1}$ of the circularly polarized light that the second reflective pigment 122 can reflect is opposite to the rotation direction $D_{BR}$ of the circularly polarized light that the first reflective pigment 121 can reflect.

The reflection wavelength ranges of the first reflective pigment 121 and the second reflective pigment 122 usually overlap with the polarized light separation wavelength range of the polarized light separation layer 111 included in the substrate 110. Part of the reflection wavelength range and part of the polarized light separation wavelength range may overlap with each other, the entire reflection wavelength range and part of the polarized light separation wavelength range may overlap with each other, part of the reflection wavelength range and the entire polarized light separation wavelength range may overlap with each other, or the entire reflection wavelength range and the entire polarized light separation wavelength range may overlap with each other. Among these, it is preferable that the reflection wavelength range falls within the polarized light separation wavelength range as a result of the entire reflection wavelength range overlapping with part or the entirety of the polarized light separation wavelength range. Accordingly, the lower limit of the reflection wavelength range is preferably equal to or more than the lower limit of the polarized light separation wavelength range, and the upper limit of the reflection wavelength range is preferably equal to or less than the upper limit of the polarized light separation wavelength range. In this case, a difference between the image of the display medium 100 which can be visually recognized when observed from one side and the image of the display medium 100 which can be visually recognized when observed from the other side can be made notably clear.

The aforementioned combination of the first reflective pigment 121 and the second reflective pigment 122 is selected so that the hue of the first reflective pigment 121 (i.e., the hue of the circularly polarized light that the first reflective pigment 121 can reflect) and the hue of the second reflective pigment 122 (i.e., the hue of the circularly polarized light that the second reflective pigment 122 can reflect) differ from each other. The expression that "hues differ" means that hues differ to a degree distinguishable by the naked eye. Generally, two pigments having different wavelength ranges over which the circularly polarized light separation function can be exhibited may have different hues. The expression that "wavelength ranges over which the circularly polarized light separation function can be exhibited differ" means that at least one, preferably two or more, and most preferably all, of the minimum wavelengths, the maximum wavelengths, center wavelengths, and wavelength widths of the wavelength ranges over which the circularly polarized light separation function can be exhibited differ. The degree of difference in these minimum wavelengths, maximum wavelengths, center wavelengths, and wavelength widths has no particular limit as long as in a range distinguishable by the naked eye. For example, such a degree of difference may be 10 nm or more, 20 nm or more, 30 nm or more, 40 nm or more, 50 nm or more, and 60 nm or more. Therefore, the reflection wavelength range of the first reflective pigment 121 and the reflection wavelength range of the second reflective pigment 122 usually differ from each other.

The positions of the first reflective pigment 121 and the second reflective pigment 122 in the first reflective layer 120 may be set appropriately so that the first reflective layer 120 having a desired design can be visually recognized when observed. For example, the first reflective pigment 121 and the second reflective pigment 122 may be each contained in a state uniformly dispersed over the entire first reflective layer 120.

The amount of the first reflective pigment 121 and the amount of the second reflective pigment 122 in the first reflective layer 120 may be set appropriately so that the first reflective layer 120 having a desired hue can be visually recognized when observed. For example, the ratio of these may be set so that the hue of the first reflective pigment 121, the hue of the second reflective pigment 122, and the mixed color of the both can be distinguished from one another by the naked eye.

The second reflective layer 130 is provided, as another reflective layer, on the second surface 110D of the substrate 110. The second reflective layer 130 may be provided directly or indirectly on the second surface 110D of the substrate 110. The second reflective layer 130 may be formed by the same manner as that of the first reflective layer 120 except that the second reflective layer 130 is formed on the second surface 110D instead of the first surface 110U.

Accordingly, the second reflective layer 130 may be provided on part of the second surface 110D of the substrate 110, or may be provided over the entire second surface 110D. The second reflective layer 130 is usually provided so as to overlap the polarized light separation layer 111 of the substrate 110 as viewed in the thickness direction thereof. In the present embodiment, a description will be given of, as an example, the second reflective layer 130 having a planar shape of a character "E" as illustrated in FIG. 3.

The second reflective layer 130 contains the first reflective pigment 131 and the second reflective pigment 132 as illustrated in FIG. 1. Although only one first reflective pigment 131 and only one second reflective pigment 132 are illustrated in FIG. 1 for the purpose of illustration, the second reflective layer 130 may usually contain a plurality of first reflective pigments 131 and a plurality of second reflective pigments 132. The first reflective pigment 131 and the second reflective pigment 132 contained in the second reflective layer 130 may be the same as the first reflective pigment 121 and the second reflective pigment 122 contained in the first reflective layer 120, respectively.

Accordingly, the first reflective pigment 131 and the second reflective pigment 132 each have a circularly polarized light separation function. Thus, in a reflection wavelength range over which the first reflective pigment 131 can be exhibit the circularly polarized light separation function, the first reflective pigment 131 can reflect circularly polarized light having one rotation direction $D_{BR}$, and transmit circularly polarized light having an opposite rotation direction to the rotation direction $D_{BR}$ therethrough. In a reflection wavelength range over which the second reflective pigment 132 can exhibit the circularly polarized light separation function, the second reflective pigment 132 can reflect circularly polarized light having one rotation direction $D_{BL}$, and transmit circularly polarized light having an opposite rotation direction to the rotation direction $D_{BL}$ therethrough. In the following description, the rotation direction of circularly polarized light that the first reflective pigment 131 contained in the second reflective layer 130 can reflect is denoted by a symbol "$D_{BR2}$" as appropriate so as to be discriminated from the rotation direction $D_{BR}$n of circularly polarized light that the first reflective pigment 121 contained in the first reflective layer 120 can reflect. Also, the rotation direction of circularly polarized light that the second reflective pigment 132 contained in the second reflective layer 130 can reflect is denoted by a symbol "$D_{BL2}$" as appropriate so as to be discriminated from the rotation direction $D_{BL1}$ of circularly polarized light that the second reflective pigment 122 contained in the first reflective layer 120 can reflect. In the present embodiment, the rotation direction $D_{BL2}$ of the circularly polarized light that the second reflective pigment 132 can reflect is opposite to the rotation direction $D_{BR2}$ of the circularly polarized light that the first reflective pigment 131 can reflect. Moreover, the reflection wavelength ranges of the first reflective pigment 131 and the second reflective pigment 132 usually overlap with the polarized light separation wavelength range of the polarized light separation layer 111 included in the substrate 110. Furthermore, the combination of the first reflective pigment 131 and the second reflective pigment 132 is selected so that the hue of the first reflective pigment 131 (i.e., the hue of the circularly polarized light that the first reflective pigment 131 can reflect) and the hue of the second reflective pigment 132 (i.e., the hue of the circularly polarized light that the second reflective pigment 132 can reflect) differ from each other.

The hue of the first reflective pigment 131 contained in the second reflective layer 130 and the hue of the first reflective pigment 121 contained in the first reflective layer 120 may be the same as or different from each other. Also, the hue of the second reflective pigment 132 contained in the second reflective layer 130 and the hue of the second reflective pigment 122 contained in the first reflective layer 120 may be the same as or different from each other. Specific types and combinations of the first reflective pigment 121, the second reflective pigment 122, the first reflective pigment 131, and the second reflective pigment 132 may be set appropriately so that the first reflective layer 120 and the second reflective layer 130 having desired designs can be visually recognized when observed.

As with the positions and amounts of the first reflective pigment 121 and the second reflective pigment 122 contained in the first reflective layer 120, the positions and amounts of the first reflective pigment 131 and the second reflective pigment 132 contained in the second reflective layer 130 may be set appropriately so that the second reflective layer 130 having a desired design and a desired hue can be visually recognized when observed.

Pigments containing flakes of cholesteric resin, for example, may be used as reflective pigments such as the first reflective pigment 121, the second reflective pigment 122, the first reflective pigment 131, and the second reflective pigment 132. Since a flake of a cholesteric resin includes a minute layer of a cholesteric resin, a pigment containing the aforementioned flake can exhibit the circularly polarized light separation function as with the layer of the cholesteric resin itself. Due to shear force applied at the time of forming a reflective layer which contains a pigment including flakes, the principal surfaces of the flakes and the layer planar surface of the reflective layer which contains the pigment including the flakes are usually oriented parallel to or approximately parallel to each other. The orientation direction of such flakes, however, may have fluctuations, and circularly polarized light reflected by such flakes may therefore cause scattering in the reflective layer as a whole. When such scattering occurs, the reflective layer may be visually recognized as an image different from its surroundings. Thus, the reflective layers such as the first reflective layer 120 and the second reflective layer 130 can be visually recognized by the aforementioned scattering even when the color of the circularly polarized light reflected by the polarized light separation layer 111 and the color of the circularly polarized light reflected by such a reflective layer are the same as each other.

The particle diameter of the flake of the cholesteric resin is preferably 1 μm or more for the decorative purpose. The particle diameter of the flake is desirably equal to or more than the thickness of the reflective layer containing a pigment including the flake. In this case, it is easy to orient each of the flakes so that the principal surface of the flake and the layer planar surface of the reflective layer are parallel to each other, or form an acute angle therebetween. Thus, the flakes can effectively receive light, and the circularly polarized light separation function of the reflective layer can thus be enhanced. The upper limit of the particle diameter of the flake is preferably 500 μm or less, and more preferably 100 μm or less, from the viewpoint of obtaining moldability and printability. Herein, the particle diameter of the flake refers to a diameter of a circle having the same area as that of the flake.

As the flake of the cholesteric resin, for example, a crushed product of a layer of the cholesteric resin described above may be used. Such flakes can be produced, for example, by the production method described in Japanese Patent No. 6142714.

The reflective layer such as the first reflective layer 120 and the second reflective layer 130 may include an optional component in combination with the reflective pigments such as the first reflective pigment 121, the second reflective pigment 122, the first reflective pigment 131 and the second reflective pigment 132. Examples of the optional component may include a binder for binding reflective pigments. Examples of the binder may include polymers such as a polyester-based polymer, an acrylic polymer, a polystyrene-based polymer, a polyamide-based polymer, a polyurethane-based polymer, a polyolefin-based polymer, a polycarbonate-based polymer, and a polyvinyl-based polymer. The amount of the binder is preferably 20 parts by weight or more, more preferably 40 parts by weight or more, and particularly preferably 60 parts by weight or more, and is preferably 1,000 parts by weight or less, more preferably 800 parts by weight or less, and particularly preferably 600 parts by weight or less, relative to 100 parts by weight of the reflective pigment.

The reflective layer such as the first reflective layer 120 and the second reflective layer 130 may be produced, for example, by applying an ink containing the reflective pigment, a solvent, and, as necessary, an optional component, and drying the ink. As a solvent, an inorganic solvent such as water may be used. Alternatively, an organic solvent such as a ketone solvent, an alkyl halide solvent, an amide solvent, a sulfoxide solvent, a heterocyclic compound, a hydrocarbon solvent, an ester solvent, and an ether solvent may be used. The amount of the solvent is preferably 40 parts by weight or more, more preferably 60 parts by weight or more, and particularly preferably 80 parts by weight or more, and is preferably 1,000 parts by weight or less, more preferably 800 parts by weight or less, and particularly preferably 600 parts by weight or less, relative to 100 parts by weight of the reflective pigment.

The ink may contain a monomer of the polymer as the binder in place of, or in combination with, the polymer. In this case, the reflective layer may be formed by applying an ink and drying the ink, and then polymerizing the monomer. When the monomer is contained, the ink preferably contains a polymerization initiator.

Figure 4:
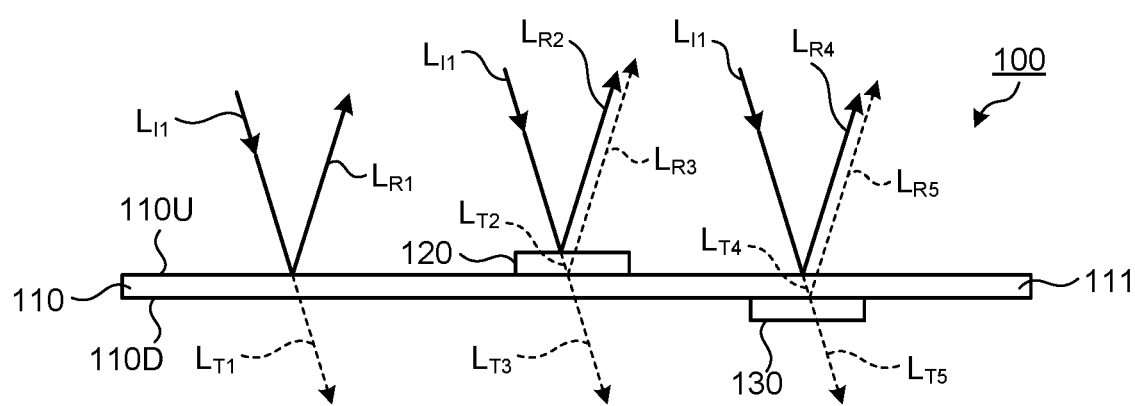
FIG. 4 is a cross-sectional view schematically illustrating the display medium according to the first embodiment of the present invention.
Figure 5:
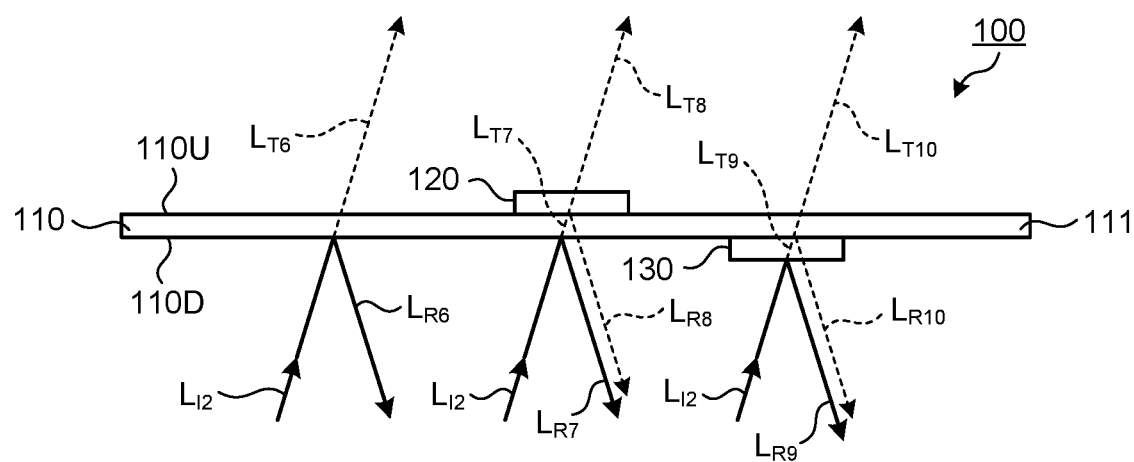
FIG. 5 is a cross-sectional view schematically illustrating the display medium according to the first embodiment of the present invention.

FIGS. 4 and 5 are cross-sectional views each schematically illustrating the display medium 100 according to the first embodiment of the present invention. FIGS. 4 and 5 briefly show paths of light reflected by the polarized light separation layer 111, the first reflective layer 120, and the second reflective layer 130. Although various light absorption and reflection other than those described below may occur in an actual display medium 100, main optical paths are briefly described in the following description for the purpose of explaining actions.

FIG. 4 illustrates a case where irradiation light $L_{I1}$, such as unpolarized light, including both clockwise circularly polarized light and counterclockwise circularly polarized light, is irradiated onto a surface of the display medium 100 on a side with the first reflective layer 120. As illustrated in FIG. 4, the irradiation light $L_{I1}$ is incident onto the polarized light separation layer 111 of the substrate 110 in an area where the first reflective layer 120 and the second reflective layer 130 are not provided. Part of the irradiation light $L_{I1}$ is reflected by the polarized light separation layer 111 as circularly polarized light $L_{R1}$ having the rotation direction $D_A$. Light $L_{T1}$, other than the reflected circularly polarized light $L_{R1}$, is transmitted through the polarized light separation layer 111 and goes out of the display medium 100. Since the circularly polarized light $L_{R1}$ is reflected by the polarized light separation layer 111, part or the entirety of the light $L_{T1}$ that has been transmitted through the polarized light separation layer 111 and gone out of the display medium 100 is circularly polarized light having an opposite rotation direction to the rotation direction $D_A$.

Moreover, in an area where the first reflective layer 120 is provided, as illustrated in FIG. 4, the first reflective layer 120 and the polarized light separation layer 111 are arranged in this order. Thus the irradiation light $L_{I1}$ is incident onto the first reflective layer 120. Since the irradiation light $L_{I1}$ is reflected by the first reflective pigment 121 (not illustrated in FIG. 4) and the second reflective pigment 122 (not illustrated in FIG. 4), reflected light $L_{R2}$ reflected by the first reflective layer 120 includes circularly polarized light having the rotation direction $D_{BR1}$, which has been reflected by the first reflective pigment 121, and circularly polarized light having the rotation direction $D_{BL1}$, which has been reflected by the second reflective pigment 122. Thus, the hue of the reflected light $L_{R2}$ by the first reflective layer 120 is a mixed color of the hue of the first reflective pigment 121 and the hue of the second reflective pigment 122. Light $L_{T2}$, other than the reflected light $L_{R2}$ reflected by the first reflective layer 120, is incident onto the polarized light separation layer 111 of the substrate 110. The incident light $L_{T2}$ may include circularly polarized light $L_{R3}$ having the rotation direction $D_A$, which may be reflected by the polarized light separation layer 111. Thus, part of the light $L_{T2}$ may be reflected by the polarized light separation layer 111 as the circularly polarized light $L_{R3}$ having the rotation direction $D_A$. Light $L_{T3}$, other than the reflected circularly polarized light $L_{R3}$, is transmitted through the polarized light separation layer 111 and goes out of the display medium 100. As with the area where the first reflective layer 120 and the second reflective layer 130 are not provided, part or the entirety of the light $L_{T3}$ that goes out of the display medium 100 is circularly polarized light having an opposite rotation direction to the rotation direction $D_A$.

Furthermore, in an area where the second reflective layer 130 is provided, as illustrated in FIG. 4, the polarized light separation layer 111 and the second reflective layer 130 are arranged in this order. Thus the irradiation light $L_{I1}$ is incident onto the polarized light separation layer 111 of the substrate 110. Part of the irradiation light $L_{I1}$ is reflected by the polarized light separation layer 111 as circularly polarized light $L_{R4}$ having the rotation direction $D_A$. Light $L_{T4}$, other than the reflected circularly polarized light $L_{R4}$, is transmitted through the polarized light separation layer 111 and is incident onto the second reflective layer 130. Since the circularly polarized light $L_{R4}$ is reflected by the polarized light separation layer 111, however, the light $L_{T4}$ that is incident onto the second reflective layer 130 includes none or just a small quantity of circularly polarized light having the rotation direction $D_A$. Herein, the rotation direction $D_{BR2}$ of circularly polarized light that the first reflective pigment 131 (not illustrated in FIG. 4) contained in the second reflective layer 130 can reflect is opposite to the rotation direction $D_{BL2}$ of circularly polarized light that the second reflective pigment 132 (not illustrated in FIG. 4) can reflect. Therefore, one of the rotation direction $D_{BR2}$ and the rotation direction $D_{BL2}$ is identical with the rotation direction $D_A$, and the other one of the rotation direction $D_{BR2}$ and the rotation direction $D_{BL2}$ is opposite to the rotation direction $D_A$. Accordingly, the light $L_{T4}$ that is incident onto the second reflective layer 130 includes none or just a small quantity of circularly polarized light that one of the first reflective pigment 131 and the second reflective pigment 132 can reflect. The entirety or a large quantity of the light $L_{T4}$ that is incident onto the second reflective layer 130 is therefore reflected not by the one of the first reflective pigment 131 and the second reflective pigment 132, but by the other one of the first reflective pigment 131 and the second reflective pigment 132. Thus, the hue of reflected light $L_R5$ by the second reflective layer 130 is identical with the hue of the other one of the first reflective pigment 131 and the second reflective pigment 132. Of the light $L_{T4}$ that is incident onto the second reflective layer 130, light $L_{T5}$, other than the reflected light $L_{R5}$, is transmitted through the second reflective layer 130 and goes out of the display medium 100. As with the area where the first reflective layer 120 and the second reflective layer 130 are not provided, part or the entirety of the light $L_{T5}$ that goes out of the display medium 100 is circularly polarized light having an opposite rotation direction to the rotation direction $D_A$.

As just described, when a surface of the display medium 100 on the side with the first reflective layer 120 is observed while being irradiated with the irradiation light $L_{I1}$ containing both clockwise circularly polarized light and counterclockwise circularly polarized light, an observer can visually recognize the first reflective layer 120 and the second reflective layer 130 as illustrated in FIG. 2. At this time, the observer visually recognizes the first reflective layer 120 which exhibits a color that is a mixture of the hue of the first reflective pigment 121 and the hue of the second reflective pigment 122. The observer also visually recognizes the second reflective layer 130 which exhibits a color that is either the hue of the first reflective pigment 131 or the hue of the second reflective pigment 132. Specifically, the second reflective layer 130 exhibits a color of the hue of the reflective pigment capable of reflecting circularly polarized light having an opposite rotation direction to the rotation direction $D_A$.

FIG. 5, on the other hand, shows a case where a surface of the display medium 100 on the side with the second reflective layer 130 is irradiated with irradiation lights $L_{I2}$, such as unpolarized light, containing both clockwise circularly polarized light and counterclockwise circularly polarized light. As illustrated in FIG. 5, in an area where the first reflective layer 120 and the second reflective layer 130 are not provided, the irradiation light $L_{I2}$ is incident onto the polarized light separation layer 111 of the substrate 110 as with the case illustrated in FIG. 4. Part of the irradiation light $L_{I2}$ is reflected by the polarized light separation layer 111 as circularly polarized light $L_{R6}$ having the rotation direction $D_A$. Light $L_{T6}$, other than the reflected circularly polarized light $L_{R6}$, is transmitted through the polarized light separation layer 111 and goes out of the display medium 100. Part or the entirety of the light $L_{T6}$ that has been transmitted through the polarized light separation layer 111 and gone out of the display medium 100 is circularly polarized light having an opposite rotation direction to the rotation direction $D_A$.

Moreover, in an area where the first reflective layer 120 is provided, as illustrated in FIG. 5, the polarized light separation layer 111 and the first reflective layer 120 are arranged in this order. Thus light reflection and transmission may occur as with the area where the second reflective layer 130 is provided in the case illustrated in FIG. 4. Specifically, part of the irradiation light $L_{I2}$ is reflected by the polarized light separation layer 111 as circularly polarized light $L_{R7}$ having the rotation direction $D_A$. Light $L_{T7}$, other than the reflected circularly polarized light $L_{R7}$, is transmitted through the polarized light separation layer 111 and is incident onto the first reflective layer 120. The entirety or a large quantity of the light $L_{T7}$ that is incident onto the first reflective layer 120 is reflected not by one of the first reflective pigment 121 (not illustrated in FIG. 5) and the second reflective pigment 122 (not illustrated in FIG. 5) but by the other one of the first reflective pigment 121 and the second reflective pigment 122. Thus, the hue of reflected light $L_{R8}$ by the first reflective layer 120 is identical with the hue of the other one of the first reflective pigment 121 and the second reflective pigment 122. Of the light $L_{T7}$ that is incident onto the first reflective layer 120, light $L_{T8}$, other than the reflected light $L_{R8}$, is transmitted through the first reflective layer 120 and goes out of the display medium 100. Part or the entirety of the light $L_{T8}$ that goes out of the display medium 100 is circularly polarized light having an opposite rotation direction to the rotation direction $D_A$.

Furthermore, in an area where the second reflective layer 130 is provided, as illustrated in FIG. 5, the second reflective layer 130 and the polarized light separation layer 111 are arranged in this order. Thus light reflection and transmission may occur as with the area where the first reflective layer 120 is provided in the case illustrated in FIG. 4. Specifically, since the irradiation light $L_{I2}$ is reflected by the first reflective pigment 131 (not illustrated in FIG. 5) and the second reflective pigment 132 (not illustrated in FIG. 5), the hue of reflected light $L_{R9}$ by the second reflective layer 130 is a mixed color of the hue of the first reflective pigment 131 and the hue of the second reflective pigment 132. Light $L_{T9}$, other than the reflected light $L_{R9}$ reflected by the second reflective layer 130, is incident onto the polarized light separation layer 111 of the substrate 110. Part of the incident light $L_{T9}$ may be reflected by the polarized light separation layer 111 as circularly polarized light $L_{R10}$ having the rotation direction $D_A$. Light $L_{T10}$, other than the reflected circularly polarized light $L_{R10}$, is transmitted through the polarized light separation layer 111 and goes out of the display medium 100. Part or the entirety of the light $L_{T10}$ that goes out of the display medium 100 is circularly polarized light having an opposite rotation direction to the rotation direction $D_A$.

As just described, when the surface of the display medium 100 on the side with the second reflective layer 130 is observed while being irradiated with the irradiation light $L_{I2}$ containing both clockwise circularly polarized light and counterclockwise circularly polarized light, the observer can visually recognize the first reflective layer 120 and the second reflective layer 130 as illustrated in FIG. 3. At this time, the observer visually recognizes the first reflective layer 120 which exhibits a color that is either the hue of the first reflective pigment 121 or the hue of the second reflective pigment 122. Specifically, the first reflective layer 120 exhibits a color of the hue of the reflective pigment capable of reflecting circularly polarized light having an opposite rotation direction to the rotation direction $D_A$. The observer also visually recognizes the second reflective layer 130 which exhibits a color that is a mixture of the hue of the first reflective pigment 131 and the hue of the second reflective pigment 132.

Thus, in the display medium 100 according to the present embodiment, the hue of the first reflective layer 120 which appears in the image which can be visually recognized when observed from the side with the first reflective layer 120, and the hue of the first reflective layer 120 which appears in the image which can be visually recognized when observed from the side with the second reflective layer 130 differ from each other even though the substrate 110 is transparent or semi-transparent. Furthermore, the hue of the second reflective layer 130 which appears in the image which can be visually recognized when observed from the side with the first reflective layer 120, and the hue of the second reflective layer 130 which appears in the image which can be visually recognized when observed from the side with the second reflective layer 130 differ from each other. Thus, the display medium 100 can achieve a unique display mode such that the image of the display medium to be visually recognized when observed from the front surface side and the image of the display medium to be visually recognized when observed from the rear surface side can be different from each other even though the substrate 110 is transparent or semi-transparent.

When a plurality of reflective layers 120 and 130 are provided in the display medium 100 as in the present embodiment, the shapes, sizes, and materials of these reflective layers, as well as the wavelengths and reflectivities of circularly polarized light reflected by these reflective layers may be the same as or different from each other.

3. Second Embodiment of Display Medium

Although the display medium 100 including the substrate 110 having no phase difference layer is taken as an example in the first embodiment, the substrate may include a phase difference layer. An embodiment in which such a substrate having a phase difference layer is used will be described below.

Figure 6:
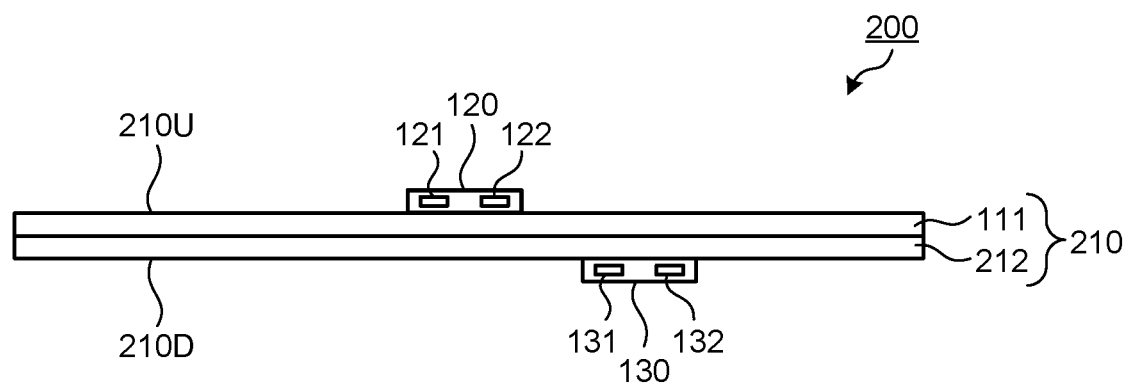
FIG. 6 is a cross-sectional view schematically illustrating a display medium according to a second embodiment of the present invention.
Figure 7:
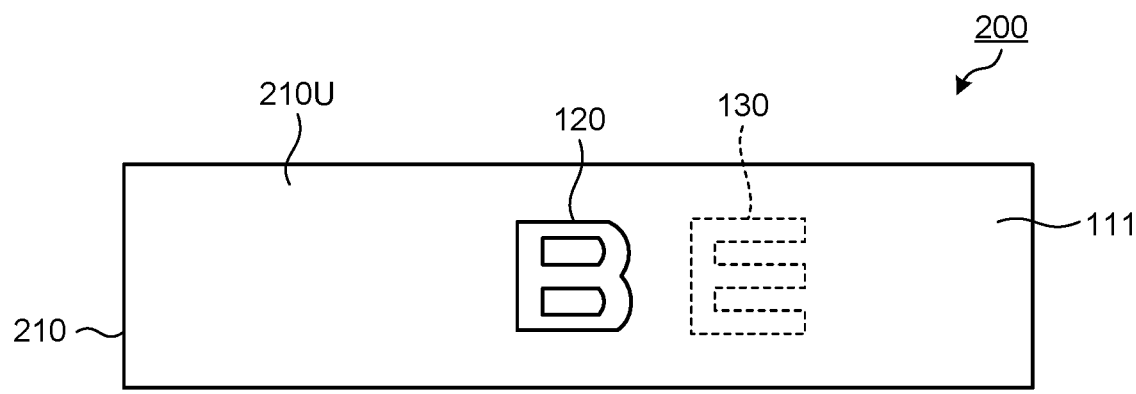
FIG. 7 is a schematic plan view of the display medium according to the second embodiment of the present invention as viewed from one side.
Figure 8:
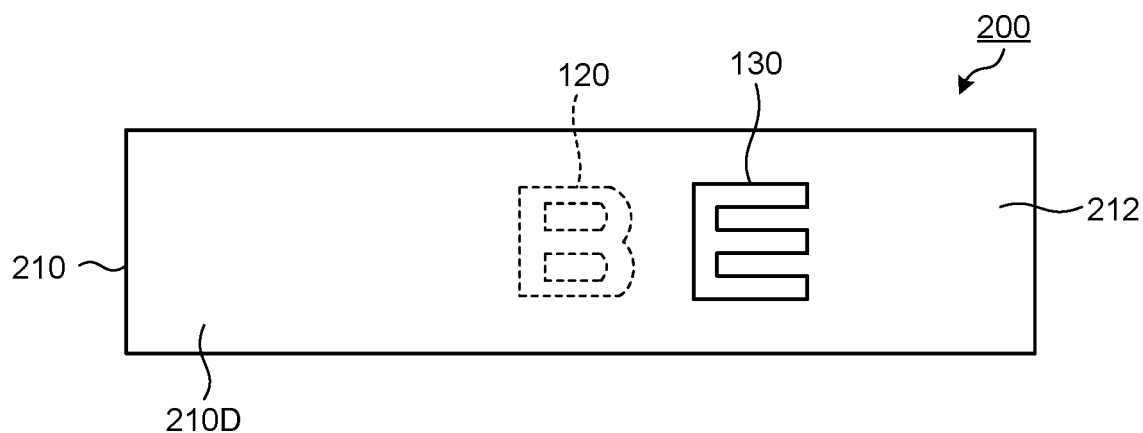
FIG. 8 is a schematic plan view of the display medium according to the second embodiment of the present invention as viewed from the other side.

FIG. 6 is a cross-sectional view schematically illustrating a display medium 200 according to a second embodiment of the present invention. FIG. 7 is a schematic plan view illustrating the display medium 200 according to the second embodiment of the present invention as viewed from one side (the side where a first reflective layer 120 is provided). FIG. 8 is a schematic plan view illustrating the display medium 200 according to the second embodiment of the present invention as viewed from the other side (the side where a second reflective layer 130 is provided).

As shown in FIGS. 6 to 8, the display medium 200 according to the second embodiment of the present invention is provided in the same manner as that of the display medium 100 according to the first embodiment except that a substrate 210 having a phase difference layer 212 is included instead of the substrate 110 having no phase difference layer 212. Accordingly, the display medium 200 according to the present embodiment includes: the substrate 210 having a first surface 210U and a second surface 210D; the first reflective layer 120 provided, as a reflective layer, on the first surface 210U of the substrate 210; and the second reflective layer 130 provided, as a reflective layer, on the second surface 210D of the substrate 210.

The substrate 210 is provided in the same manner as that of the substrate 110 described in the first embodiment except that the substrate 210 includes the phase difference layer 212 in combination with a polarized light separation layer 111. The substrate 210 has the first surface 210U as a surface closer to the polarized light separation layer, and has the second surface 210D as a surface closer to the phase difference layer. The "surface closer to the polarized light separation layer" of the substrate 210 refers to one of the front surface and rear surface of the substrate 210 at which a distance to the polarized light separation layer 111 is shorter than a distance to the phase difference layer 212. Also, the "surface closer to the phase difference layer" of the substrate 210 refers to one of the front surface and rear surface of the substrate 210 at which a distance to the polarized light separation layer 111 is longer than a distance to the phase difference layer 212.

The phase difference layer 212 is a layer having an in-plane retardation Re in a particular range, which is provided on one side of the polarized light separation layer 111. Part or the entirety of the phase difference layer 212 overlaps part or the entirety of the polarized light separation layer 111 as viewed in the thickness direction thereof. That is, the position of the part or the entirety of the phase difference layer 212 and the position of the part or the entirety of the polarized light separation layer 111 are the same as each other in in-plane directions perpendicular to the thickness direction of the display medium 200. Furthermore, the part or the entirety of the phase difference layer 212 is provided so as to overlap the first reflective layer 120 and the second reflective layer 130 as viewed in the thickness direction thereof. That is, the position of the part or the entirety of the phase difference layer 212 and the position of the entire first reflective layer 120 and the entire second reflective layer 130 are usually the same as each other in the in-plane directions perpendicular to the thickness direction of the display medium 200. In the present embodiment, a description will be given of, as an example, a case where the entire phase difference layer 212 and the entire polarized light separation layer 111 overlap each other, and part of the phase difference layer 212 overlaps the entire first reflective layer 120 and the entire second reflective layer 130 as viewed in the thickness direction thereof.

The range of the in-plane retardation Re of the phase difference layer 212 may be set within a range in which an image of the display medium 200 to be visually recognized when observed from one side and an image of the display medium 200 to be visually recognized when observed from the other side differ from each other to a degree capable of obtaining a desired design. The in-plane retardation Re of the phase difference layer 212 is usually set so that the rotation direction of circularly polarized light that has been transmitted through the polarized light separation layer 111 can be inverted.

In a case where the measurement wavelength is 590 nm, a specific range of the in-plane retardation Re of the phase difference layer 212 is preferably "$\{(2n+1)/2\} \times 590$ nm$-30$ nm" or more, more preferably "$\{(2n+1)/2\} \times 590$ nm$-20$ nm" or more, and particularly preferably "$\{(2n+1)/2\} \times 590$ nm$-10$ nm" or more, and is preferably "$\{(2n+1)/2\} \times 590$ nm$+30$ nm" or less, more preferably "$\{(2n+1)/2\} \times 590$ nm$+20$ nm" or less, and particularly preferably "$\{(2n+1)/2\} \times 590$ nm$+10$ nm" or less. Herein, n represents an integer of 0 or larger. Since the phase difference layer 212 having the in-plane retardation Re in the aforementioned range at the measurement wavelength of 590 nm can usually a function as a half-wave plate in a broad range of a visible wavelength region, the phase difference layer 212 can appropriately adjust a polarization state of circularly polarized light of various colors. Therefore, since the flexibility, in terms of color, of the reflective layer such as the first reflective layer 120 and the second reflective layer 130, and the display layer of the display article (not illustrated in FIGS. 6 to 8) can be enhanced, a display mode with advanced design can be achieved.

The phase difference layer 212 preferably has a reverse wavelength dispersion property. The reverse wavelength dispersion property is a property in which in-plane retardations Re(450) and Re(550) at measurement wavelengths of 450 nm and 550 nm, respectively, satisfy Equation (R1) described below.

$$Re(450) < Re(550) \tag{R1}$$

The phase difference layer 212 having the reverse wavelength dispersion property can exhibit an optical function thereof in a broad wavelength range. Therefore, by using the phase difference layer 212 having the reverse wavelength dispersion property, the phase difference layer 212 can function as a half-wave plate in a broad range of a visible wavelength region. Thus, the phase difference layer 212 can appropriately adjust a polarization state of circularly polarized light of various colors. Therefore, since the flexibility, in terms of color, of the reflective layer such as the first reflective layer 120 and the second reflective layer 130, and the display layer of the display article (not illustrated in FIGS. 6 to 8) can be enhanced, a display mode with advanced design can be achieved.

As the phase difference layer 212, a stretched film can be used, for example. The stretched film is a film obtained by stretching a resin film and can have any in-plane retardation by appropriately adjusting factors such as a type of the resin, stretching conditions, and a thickness. As the resin, thermoplastic resins can be usually used. The thermoplastic resin may contain a polymer, and an optional component as necessary. Examples of the polymer may include polycarbonate, polyether sulfone, polyethylene terephthalate, polyimide, polymethyl methacrylate, polysulfone, polyarylate, polyethylene, polyphenylene ether, polystyrene, polyvinyl chloride, cellulose diacetate, cellulose triacetate, and an alicyclic structure-containing polymer. As the polymer, one type thereof may be solely used, and two or more types thereof may also be used in combination at any ratio. Among these, the alicyclic structure-containing polymer is preferable from the viewpoint of transparency, low hygroscopicity, size stability, and workability. The alicyclic structure-containing polymer is a polymer having an alicyclic structure in a main chain and/or a side chain, and those described in Japanese Patent Application Laid-Open No. 2007-057971 A can be used, for example.

The stretched film which serves as the phase difference layer 212 can be produced by producing a resin film from the aforementioned resin and then subjecting the resin film to a stretching treatment. As a specific example of the method for producing the phase difference layer 212 as the stretched film, methods described in International Publication No. 2019/059067 may be mentioned.

The thickness of the stretched film is not particularly limited, and is preferably 5 µm or more, more preferably 10 µm or more, and particularly preferably 20 µm or more, and is preferably 1 mm or less, more preferably 500 µm or less, and particularly preferably 200 µm or less.

As the phase difference layer 212, a liquid crystal cured layer may be used, for example. The liquid crystal cured layer is a layer formed of a cured product of a liquid crystal composition containing a liquid crystal compound. Usually, the liquid crystal cured layer is obtained by forming a layer of a liquid crystal composition, orienting the molecules of the liquid crystal compound contained in the layer of the liquid crystal composition, and then curing the layer of the liquid crystal composition. The liquid crystal cured layer can have any in-plane retardation by appropriately adjusting factors such as a type of the liquid crystal compound, an orientation state of the liquid crystal compound, and a thickness.

The type of the liquid crystal compound is optionally selected, and in a case where the phase difference layer 212 which has a reverse wavelength dispersion property is to be obtained, a liquid crystal compound with a reverse wavelength dispersion property is preferably used. The liquid crystal compound with a reverse wavelength dispersion property refers to a liquid crystal compound which exhibits a reverse wavelength dispersion property in a case where the liquid crystal compound is oriented homogeneously. The homogeneous orientation of a liquid crystal compound means that a layer containing the liquid crystal compound is formed, and a direction giving the maximum refractive index in the refractive index ellipsoid of the molecule of the liquid crystal compound in the layer is oriented in one direction parallel to the surface of the layer. Specific examples of the liquid crystal compound with a reverse wavelength dispersion property may include compounds described in International Publication No. 2014/069515 and International Publication No. 2015/064581.

The thickness of the liquid crystal cured layer is not particularly limited, and is preferably 0.5 µm or more, and more preferably 1.0 µm or more, and is preferably 10 µm or less, more preferably 7 µm or less, and particularly preferably 5 µm or less.

In the substrate 210 including such a phase difference layer 212 in combination with the polarized light separation layer 111, circularly polarized light to be blocked can be switched between clockwise circularly polarized light and counterclockwise circularly polarized light depending on the direction, the front facing direction or the back facing direction. Specifically, when the first surface 210U (i.e., the surface closer to the polarized light separation layer) of the substrate 210 is irradiated with irradiation light including circularly polarized light having the rotation direction $D_A$ that the polarized light separation layer 111 can reflect and circularly polarized light having the opposite rotation direction to the rotation direction $D_A$, the substrate 210 reflects the circularly polarized light having the rotation direction $D_A$ and transmits the remaining circularly polarized light therethrough. When the second surface 210D (i.e., the surface closer to the phase difference layer) of the substrate 210 is irradiated with the irradiation light, on the other hand, the substrate 210 reflects the circularly polarized light having the opposite rotation direction to the rotation direction $D_A$ and transmits the remaining circularly polarized light therethrough. Thus, polarized light to be reflected by the first reflective layer 120 and the second reflective layer 130 in the display medium 200 according to the present embodiment in which the substrate 210 including the phase difference layer 212 is used are different from those in the display medium 100 described in the first embodiment. The display medium 200 of the present embodiment can therefore achieve a display mode different from that of the display medium 100 described in the first embodiment. The display mode will be specifically described below with reference to the drawings.

Figure 9:
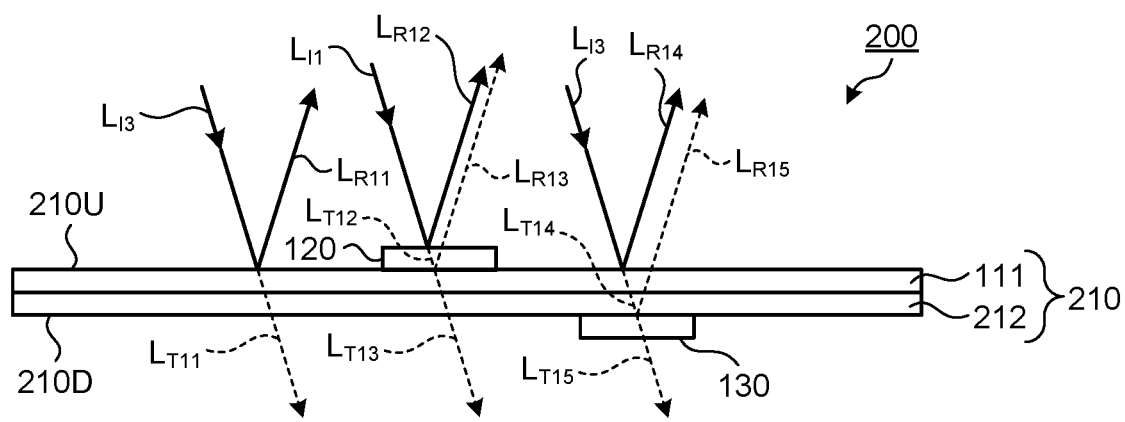
FIG. 9 is a cross-sectional view schematically illustrating the display medium according to the second embodiment of the present invention.
Figure 10:
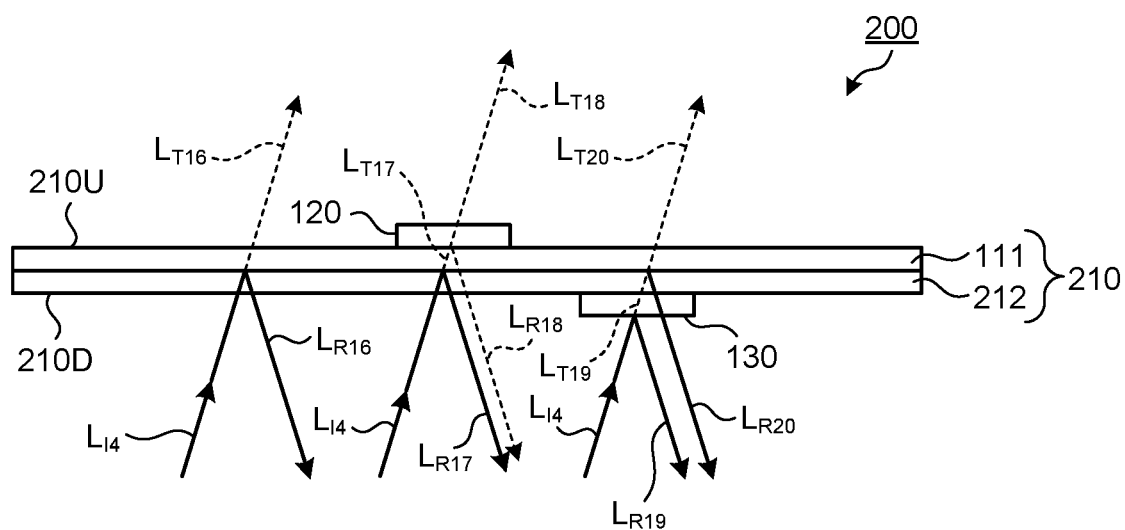
FIG. 10 is a cross-sectional view schematically illustrating the display medium according to the second embodiment of the present invention.

FIGS. 9 and 10 are each a cross-sectional view schematically illustrating the display medium 200 according to the second embodiment of the present invention. FIGS. 9 and 10 schematically illustrate paths of light reflected by the polarized light separation layer 111, the first reflective layer 120, and the second reflective layer 130. Although various light absorption and reflection other than those described below may occur in an actual display medium 200, main optical paths are briefly described in the following description for the purpose of explaining actions.

FIG. 9 illustrates a case where irradiation light $L_{I3}$, such as unpolarized light, including both clockwise circularly polarized light and counterclockwise circularly polarized light, is irradiated onto a surface of the display medium 200 on a side with the first reflective layer 120. As illustrated in FIG. 9, in an area where the first reflective layer 120 and the second reflective layer 130 are not provided, the irradiation light $L_{I3}$ is incident onto the polarized light separation layer 111 of the substrate 210 since the polarized light separation layer 111 and the phase difference layer 212 are arranged in this order. Part of the irradiation light $L_{I3}$ is reflected by the polarized light separation layer 111 as circularly polarized light $L_{R11}$ having the rotation direction $D_A$. Light $L_{T11}$, other than the reflected circularly polarized light $L_{R11}$, is transmitted through the polarized light separation layer 111, further is transmitted through the phase difference layer 212, and goes out of the display medium 200. Since the circularly polarized light $L_{R11}$ is reflected by the polarized light separation layer 111, part or the entirety of the light $L_{T11}$ transmitted through the polarized light separation layer 111 is circularly polarized light having an opposite rotation direction to the rotation direction $D_A$ as of when the light $L_{T11}$ has just been transmitted through the polarized light separation layer 111. Since its rotation direction is inverted by transmitting the light through the phase difference layer 212, however, part or the entirety of circularly polarized light contained in the light $L_{T11}$ that has been transmitted through the phase difference layer 212 and gone out of the display medium 200 is circularly polarized light having the same rotation direction as the rotation direction $D_A$.

In an area where the first reflective layer 120 is provided, as illustrated in FIG. 9, the irradiation light $L_{I3}$ is incident onto the first reflective layer 120 since the first reflective layer 120, the polarized light separation layer 111, and the phase difference layer 212 are arranged in this order. Since the irradiation light $L_{I3}$ is reflected by the first reflective pigment 121 (not illustrated in FIG. 9) and the second reflective pigment 122 (not illustrated in FIG. 9), the hue of reflected light $L_{R12}$ by the first reflective layer 120 is a mixed color of the hue of the first reflective pigment 121 and the hue of the second reflective pigment 122. Light $L_{T12}$, other than the reflected circularly polarized light $L_{R12}$ reflected by the first reflective layer 120, is incident onto the polarized light separation layer 111 of the substrate 210. Part of the incident light $L_{T12}$ may be reflected by the polarized light separation layer 111 as circularly polarized light $L_{R13}$ having the rotation direction $D_A$. Light $L_{T13}$, other than the reflected circularly polarized light $L_{R13}$, is transmitted through the polarized light separation layer 111 and the phase difference layer 212, and goes out of the display medium 200. As with the area where the first reflective layer 120 and the second reflective layer 130 are not provided, part or the entirety of the light $L_{T13}$ that goes out of the display medium 200 is circularly polarized light having the same rotation direction as the rotation direction $D_A$.

Furthermore, in an area where the second reflective layer 130 is provided, as illustrated in FIG. 9, the irradiation light $L_{I3}$ is incident onto the polarized light separation layer 111 of the substrate 210 since the polarized light separation layer 111, the phase difference layer 212, and the second reflective layer 130 are arranged in this order. Part of the irradiation light $L_{I3}$ is reflected by the polarized light separation layer 111 as circularly polarized light $L_{R14}$ having the rotation direction $D_A$. Light $L_{T14}$, other than the reflected circularly polarized light $L_{R14}$, is transmitted through the polarized light separation layer 111, further is transmitted through the phase difference layer 212, and is incident onto the second reflective layer 130. For the light $L_{T14}$ having been transmitted through the polarized light separation layer 111, the rotation direction of that circularly polarized light is inverted by transmitting the light through the phase difference layer 212. Thus, the light $L_{T14}$ includes none or just a small quantity of circularly polarized light having the opposite rotation direction to the rotation direction $D_A$ as of when the light $L_{T14}$ has been transmitted through the phase difference layer 212 and is incident onto the second reflective layer 130. Thus, the light $L_{T14}$ that is incident onto the second reflective layer 130 includes none or just a small quantity of circularly polarized light that one of the first reflective pigment 131 (not illustrated in FIG. 9) and the second reflective pigment 132 (not illustrated in FIG. 9) can reflect. The entirety or a large quantity of the light $L_{T14}$ that is incident onto the second reflective layer 130 is therefore reflected not by the one of the first reflective pigment 131 and the second reflective pigment 132, but by the other one of the first reflective pigment 131 and the second reflective pigment 132. Thus, the hue of reflected light $L_{R15}$ by the second reflective layer 130 is identical with the hue of the other one of the first reflective pigment 131 and the second reflective pigment 132. Of the light $L_{T14}$ that is incident onto the second reflective layer 130, light $L_{T15}$, other than the reflected light $L_{R15}$, is transmitted through the second reflective layer 130 and goes out of the display medium 200. As with the area where the first reflective layer 120 and the second reflective layer 130 are not provided, part or the entirety of the light $L_{T15}$ that goes out of the display medium 200 is circularly polarized light having the same rotation direction as the rotation direction $D_A$.

As just described, when the surface of the display medium 200 on the side with the first reflective layer 120 is observed while being irradiated with the irradiation lights $L_{I3}$ containing both clockwise circularly polarized light and counterclockwise circularly polarized light, the observer can visually recognize the first reflective layer 120 and the second reflective layer 130 as illustrated in FIG. 7. At this time, the observer visually recognizes the first reflective layer 120 which exhibits a color that is a mixture of the hue of the first reflective pigment 121 and the hue of the second reflective pigment 122. The observer also visually recognizes the second reflective layer 130 which exhibits a color that is either the hue of the first reflective pigment 131 or the hue of the second reflective pigment 132. Specifically, the second reflective layer 130 exhibits a color of the hue of the reflective pigment capable of reflecting circularly polarized light having the same rotation direction as the rotation direction $D_A$.

FIG. 10 illustrates a case where irradiation light $L_{I4}$, such as unpolarized light, including both clockwise circularly polarized light and counterclockwise circularly polarized light is irradiated onto a surface of the display medium 200 on the side with the second reflective layer 130. As illustrated in FIG. 10, in an area where the first reflective layer 120 and the second reflective layer 130 are not provided, the irradiation light $L_{I4}$ is transmitted through the phase difference layer 212 and is incident onto the polarized light separation layer 111 since the phase difference layer 212 and the polarized light separation layer 111 are arranged in this order. Part of the irradiation light $L_{I4}$ is reflected by the polarized light separation layer 111 as circularly polarized light $L_{R16}$ having the rotation direction $D_A$, and is transmitted through the phase difference layer 212 to cause the rotation direction thereof to be inverted. Light $L_{T16}$, other than the reflected circularly polarized light $L_{R16}$, is transmitted through the polarized light separation layer 111 and goes out of the display medium 200. Since the circularly polarized light $L_{R16}$ is reflected by the polarized light separation layer 111, part or the entirety of the light $L_{T16}$ that has been transmitted through the polarized light separation layer 111 and gone out of the display medium 200 is circularly polarized light having the opposite rotation direction to the rotation direction $D_A$.

Additionally, in an area where the first reflective layer 120 is provided, as illustrated in FIG. 10, the irradiation light $L_{I4}$ is transmitted through the phase difference layer 212 and is incident onto the polarized light separation layer 111 since the phase difference layer 212, the polarized light separation layer 111, and the first reflective layer 120 are arranged in this order. Part of the irradiation light $L_{I4}$ is reflected by the polarized light separation layer 111 as circularly polarized light $L_{R17}$ having the rotation direction $D_A$, and is transmitted through the phase difference layer 212 to cause the rotation direction thereof to be inverted. Light $L_{T17}$, other than the reflected circularly polarized light $L_{R17}$, is transmitted through the polarized light separation layer 111 and is incident onto the first reflective layer 120. The light $L_{T17}$ that is incident onto the first reflective layer 120 includes none or just a small quantity of circularly polarized light having the rotation direction $D_A$. Thus, the light $L_{T17}$ that is incident onto the first reflective layer 120 includes none or just a small quantity of circularly polarized light that one of the first reflective pigment 121 (not illustrated in FIG. 10) and the second reflective pigment 122 (not illustrated in FIG. 10) can reflect. The entirety or a large quantity of the light $L_{T17}$ that is incident onto the first reflective layer 120 is therefore reflected not by the one of the first reflective pigment 121 and the second reflective pigment 122, but by the other one of the first reflective pigment 121 and the second reflective pigment 122. Thus, the hue of reflected light $L_{R18}$ by the first reflective layer 120 is identical with the hue of the other one of the first reflective pigment 121 and the second reflective pigment 122. Of the light $L_{T17}$ that is incident onto the first reflective layer 120, light $L_{T18}$, other than the reflected light $L_{R11}$, is transmitted through the first reflective layer 120 and goes out of the display medium 200. As with the area where the first reflective layer 120 and the second reflective layer 130 are not provided, part or the entirety of the light $L_{T18}$ that goes out of the display medium 200 is circularly polarized light having the opposite rotation direction to the rotation direction $D_A$.

Furthermore, in an area where the second reflective layer 130 is provided, as illustrated in FIG. 10, the irradiation light $L_{I4}$ is incident onto the second reflective layer 130 since the second reflective layer 130, the phase difference layer 212, and the polarized light separation layer 111 are arranged in this order. Since the irradiation light $L_{I4}$ is reflected by the first reflective pigment 131 (not illustrated in FIG. 10) and the second reflective pigment 132 (not illustrated in FIG. 10), the hue of reflected light $L_{R19}$ by the second reflective layer 130 is a mixed color of the hue of the first reflective pigment 131 and the hue of the second reflective pigment 132. Light $L_{T19}$, other than the reflected light $L_{R19}$ reflected by the second reflective layer 130, is transmitted through the phase difference layer 212 of the substrate 210 and is incident onto the polarized light separation layer 111. Part of the incident light $L_{T19}$ is reflected by the polarized light separation layer 111 as circularly polarized light $L_{R20}$ having the rotation direction $D_A$, and is transmitted through the phase difference layer 212 to cause the rotation direction thereof to be inverted. Light $L_{T20}$, other than the reflected circularly polarized light $L_{R20}$, is transmitted through the polarized light separation layer 111 and goes out of the display medium 200. As with the area where the first reflective layer 120 and the second reflective layer 130 are not provided, part or the entirety of the light $L_{T20}$ that goes out of the display medium 200 is circularly polarized light having the opposite rotation direction to the rotation direction $D_A$.

As just described, when the surface of the display medium 200 on the side with the second reflective layer 130 is observed while being irradiated with the irradiation lights $L_{I4}$ containing both clockwise circularly polarized light and counterclockwise circularly polarized light, an observer can visually recognize the first reflective layer 120 and the second reflective layer 130 as illustrated in FIG. 8. At this time, the observer visually recognizes the first reflective layer 120 which exhibits a color that is either the hue of the first reflective pigment 121 or the hue of the second reflective pigment 122. Specifically, the first reflective layer 120 exhibits a color of the hue of the reflective pigment capable of reflecting circularly polarized light having the opposite rotation direction to the rotation direction $D_A$. The observer also visually recognizes the second reflective layer 130 which exhibits a color that is a mixture of the hue of the first reflective pigment 131 and the hue of the second reflective pigment 132.

Thus, in the display medium 200 according to the present embodiment, the second reflective layer 130 exhibits a color of the hue of the reflective pigment capable of reflecting circularly polarized light having "the same" rotation direction as the rotation direction $D_A$ when the surface of the display medium 200 on the side with the first reflective layer 120 is irradiated with the irradiation light $L_{I3}$ as illustrated in FIG. 9. This differs from the first embodiment in which the second reflective layer 130 exhibits a color of the hue of the reflective pigment capable of reflecting circularly polarized light having the rotation direction "opposite to" the rotation direction $D_A$ when the display medium is similarly irradiated with the irradiation light $L_{I1}$ as illustrated in FIG. 4.

Moreover, in the display medium 200 according to the present embodiment, part or the entirety of the light $L_{T11}$, $L_{T13}$, and $L_{T15}$ that has been transmitted through and gone out of the display medium 200 when the surface of the display medium 200 on the side with the first reflective layer 120 is irradiated with the irradiation lights $L_{I3}$ as illustrated in FIG. 9 are circularly polarized light having "the same" rotation direction as the rotation direction $D_A$. This differs from the first embodiment in which part or the entirety of the light $L_{T1}$, $L_{T3}$, and $L_{T5}$ that has been transmitted through and gone out of the display medium 100 when the display medium is similarly irradiated with the irradiation light $L_{I1}$ as illustrated in FIG. 4 are circularly polarized light having the rotation direction "opposite to" the rotation direction $D_A$.

Thus, the display medium 200 according to the second embodiment can achieve a display mode different from the display medium 100 described in the first embodiment through the use of the aforementioned differences from the first embodiment.

Moreover, the display medium 200 according to the second embodiment can obtain advantages the same as those described in the first embodiment.

4. Modified Example of Display Medium

The display media are not limited to those described in the above-described first and second embodiments.

For example, in the above-described embodiment, the display media 100 and 200 including the first reflective layer 120 and the second reflective layer 130 in combination are shown, but may include only one of the first reflective layer 120 and the second reflective layer 130.

Furthermore, for example, the display medium may further include an optional component in combination with the above-mentioned substrates 110 and 210, and the reflective layers such as the first reflective layer 120 and the second reflective layer 130. As a specific example, the display medium may include an optional layer having a circularly polarized light separation function on the surface of the substrate in addition to the first reflective layer 120 and the second reflective layer 130. For example, an optional layer that includes one of the first and second reflective pigments 121 and 122 and does not include the other one of them may be provided.

Furthermore, for example, the display medium may include an optional non-chiral layer including a colorant, such as a pigment and a dye, with no circularly polarized light separation function on the surface of the substrate. Usually, this non-chiral layer can be visually recognized when observed from the front surface and also from the rear surface.

Furthermore, for example, the display medium may include an adhesive layer for bonding the above-described layers together. As a specific example, the display medium may include an adhesive layer between the substrate and the first reflective layer, and may include an adhesive layer between the substrate and the second reflective layer. It is preferable that the adhesive layer has a small in-plane retardation as with the optional layer that the substrates 110 and 210 may have.

Furthermore, for example, the display medium may include a cover layer which protects each of the above-described layers. These cover layers are preferably provided on an outer side of the layers described above. As a specific example, the display medium may include a cover layer, a second reflective layer, a substrate, a first reflective layer, and a cover layer in this order in the thickness direction. Such a cover layer may be formed of a transparent material and may be formed of, for example, a resin.

Furthermore, for example, the display medium may include an optional layer with a small in-plane retardation between the respective layers described above and as an outermost layer of the display medium as long as the advantageous effects of the present invention are not significantly impaired. Such an optional layer with a small in-plane retardation may be referred to as a "low Re layer" hereinafter. The specific in-plane retardation of the low Re layer is usually 0 nm or more and 5 nm or less. Examples of the position where the low Re layer is provided may include, but are not limited to, a position on the first reflective layer on an opposite side to the side with the substrate, a position between the first reflective layer and the substrate, a position between the polarized light separation layer and the phase difference layer, a position between the substrate and the second reflective layer, and a position on the second reflective layer on an opposite side to the side with the substrate. The low Re layer preferably has a high light transmittance. The total light transmittance of the low Re layer is preferably 80% or more, and more preferably 85% or more. Examples of the material of the low Re layer may include hard polyvinyl chloride, soft polyvinyl chloride, acrylic resin, glass, polycarbonate (PC), and polyethylene terephthalate (PET). The materials may be appropriately selected according to use applications of the display medium, texture required, durability, and mechanical strength.

5. Third Embodiment of Display Set

The display medium described above may be combined with a display article that is to be observed through the display medium, and the combination may be used as a display set. The display article to be combined with the display medium includes a foundation article and a display layer provided on the foundation article. The display layer contains a display pigment that is capable of reflecting circularly polarized light having a rotation direction $D_D$, which is one of clockwise and counterclockwise rotation directions, and is capable of transmitting circularly polarized light having the opposite rotation direction to the rotation direction $D_D$ therethrough. Hereinafter, an embodiment of the display set including the display medium and the display article will be described in detail with reference to the drawings.

Figure 11:
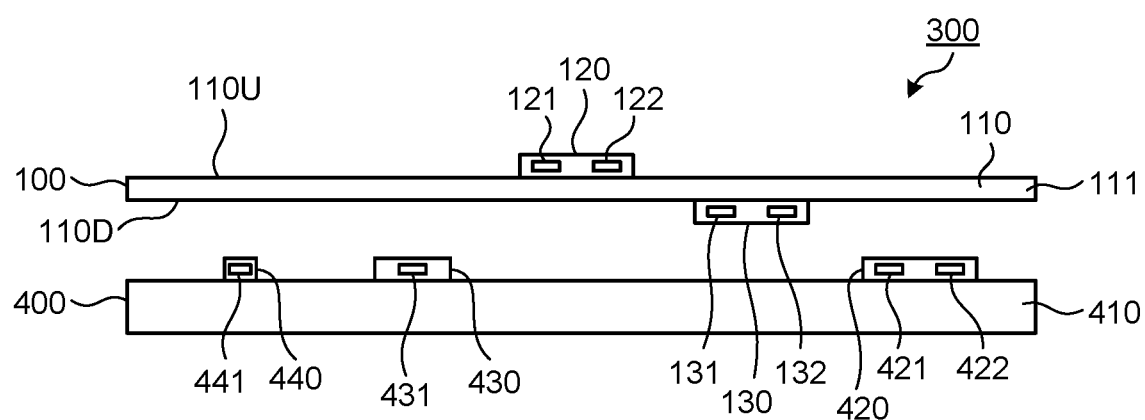
FIG. 11 is a cross-sectional view schematically illustrating a display set according to a third embodiment of the present invention.

FIG. 11 is a cross-sectional view schematically illustrating a display set 300 according to a third embodiment of the present invention. As illustrated in FIG. 11, the display set 300 according to the third embodiment of the present invention includes a display medium 100 and a display article 400. The present embodiment will be described by illustrating the display set 300 including the display medium 100 described in the first embodiment as an example.

Figure 12:
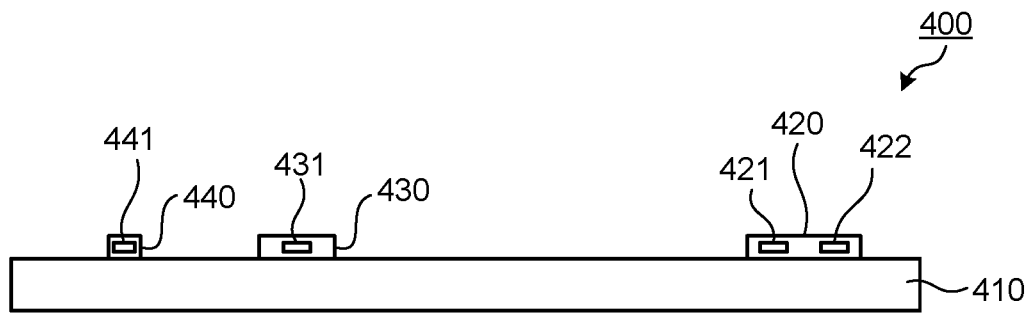
FIG. 12 is a cross-sectional view schematically illustrating a display article included in the display set according to the third embodiment of the present invention.
Figure 13:
FIG. 13 is a plan view schematically illustrating the display article included in the display set according to the third embodiment of the present invention.

FIG. 12 is a cross-sectional view schematically illustrating a display article 400 included in the display set 300 according to the third embodiment of the present invention. FIG. 13 is a plan view schematically illustrating the display article 400 included in the display set 300 according to the third embodiment of the present invention. As illustrated in FIGS. 12 and 13, the display article 400 includes a foundation article 410, and a first display layer 420, a second display layer 430, and a third display layer 440 as display layers provided on the foundation article 410.

The foundation article 410 is an article on which display layers such as the first display layer 420, the second display layer 430, and the third display layer 440 are provided, and its range is not limited. Examples of the foundation article 410 may include, but are not limited to, cloth products such as clothing; leather products such as bags and shoes; metal products such as screws; paper products such as price tags; plastic products such as cards and plastic banknotes; and rubber products such as tires.

The first display layer 420, the second display layer 430, and the third display layer 440 as the display layers each contain a display pigment which has a circularly polarized light separation function. The display pigment can reflect circularly polarized light having one rotation direction $D_D$ and can transmit circularly polarized light having an opposite rotation direction to the rotation direction $D_D$ therethrough, in a wavelength range in which the display pigment can exhibit the circularly polarized light separation function. In the following description, the wavelength range in which the display pigment can exhibit the circularly polarized light separation function may be referred to as a "display wavelength range" as appropriate.

The display wavelength range of the display pigment usually overlaps with the polarized light separation wavelength range of the polarized light separation layer 111 included in the substrate 110 of the display medium 100. Part of the display wavelength range and part of the polarized light separation wavelength range may overlap with each other, the entirety of the display wavelength range and part of the polarized light separation wavelength range may overlap with each other, part of the display wavelength range and the entirety of the polarized light separation wavelength range may overlap with each other, and the entirety of the display wavelength range and the entirety of the polarized light separation wavelength range may overlap with each other.

The type of the display pigment may be selected so that the display pigment can reflect circularly polarized light of a desired hue. The positions and amounts of the display pigments in the respective display layers may be set appropriately so that the display layer having a desired design and a desired hue can be visually recognized when observed.

The display layer may contain a combination of a first display pigment 421 and a second display pigment 422 with different rotation directions and hues, such as the first display layer 420. Specifically, the first display pigment 421 can reflect the circularly polarized light having one rotation direction $D_{DR}$ and can transmit the circularly polarized light having an opposite rotation direction to the rotation direction $D_{DR}$ therethrough, in the wavelength range over which the first display pigment 421 can exhibit the circularly polarized light separation function. Further, the second display pigment 422 can reflect the circularly polarized light having one rotation direction $D_{DL}$ and can transmit the circularly polarized light having an opposite rotation direction to the rotation direction $D_{DL}$ therethrough, in the wavelength range over which the second display pigment 422 can exhibit the circularly polarized light separation function. Here, the rotation direction $D_{DR}$ of the circularly polarized light that the first display pigment 421 can reflect and the rotation direction $D_{DL}$ of the circularly polarized light that the second display pigment 422 can reflect are opposite to each other. Furthermore, the hue of the first display pigment 421 (that is, the hue of circularly polarized light that the first display pigment 421 can reflect) and the hue of the second display pigment 422 (that is, the hue of circularly polarized light that the second display pigment 422 can reflect) are different from each other.

The display layer may also contain a third display pigment 431 capable of reflecting circularly polarized light having the same rotation direction $D_{D3}$ as the rotation direction $D_A$ of the circularly polarized light that the polarized light separation layer 111 included in the substrate 110 of the display medium 100 can reflect, and capable of transmitting the circularly polarized light having an opposite rotation direction to the rotation direction $D_{D3}$ therethrough, as with the second display layer 430, for example.

The display layer may further contain a fourth display pigment 441 capable of reflecting circularly polarized light having the opposite rotation direction $D_{D4}$ to the rotation direction $D_A$ of the circularly polarized light that the polarized light separation layer 111 included in the substrate 110 of the display medium 100 can reflect, and capable of transmitting the circularly polarized light having the opposite rotation direction to the rotation direction $D_{D4}$ therethrough, as with the third display layer 440, for example.

In FIGS. 11 and 12, for the purpose of illustration, one display pigment for each of the first display pigment 421, the second display pigment 422, the third display pigment 431, and the fourth display pigment 441 is shown, but usually, the first display layer 420, the second display layer 430, and the third display layer 440 may each contain pluralities of respective display pigments.

Examples of the display pigments such as the first display pigment 421, the second display pigment 422, the third display pigment 431, and the fourth display pigment 441 that can be used may include the same ones as the reflective pigments such as the first reflective pigments 121 and 131 and the second reflective pigments 122 and 132. Therefore, the display layers such as the first display layer 420, the second display layer 430, and the third display layer 440 are formed as a layer containing flakes of a cholesteric resin, as with the first reflective layer 120 described in the first embodiment.

In the present embodiment, as illustrated in FIG. 13, the display article 400 in which the first display layer 420 having a planar shape of a character "M", the second display layer 430 having a planar shape of a character "S", and the third display layer 440 having a planar shape of a character "I" are provided on the sheet-shape foundation article 410 will be described as an example.

The display set 300 includes a combination of the display medium 100 and the display article 400 with the above-described configurations. Therefore, an observer who observes the display set 300 with such a configuration can visually recognize the image described below.

As illustrated in FIG. 11, a case will be described in which the display medium 100 and the display article 400 are overlapped with each other in a direction where the surface of the display medium 100 on the side with the second reflective layer 130 faces toward the display article 400. In this case, the observer usually observes the display set 300 from above in the drawing. Therefore, the observer observes the display medium 100 from the side with the first reflective layer 120 and also simultaneously observes the display article 400 through the display medium 100.

Figure 14:
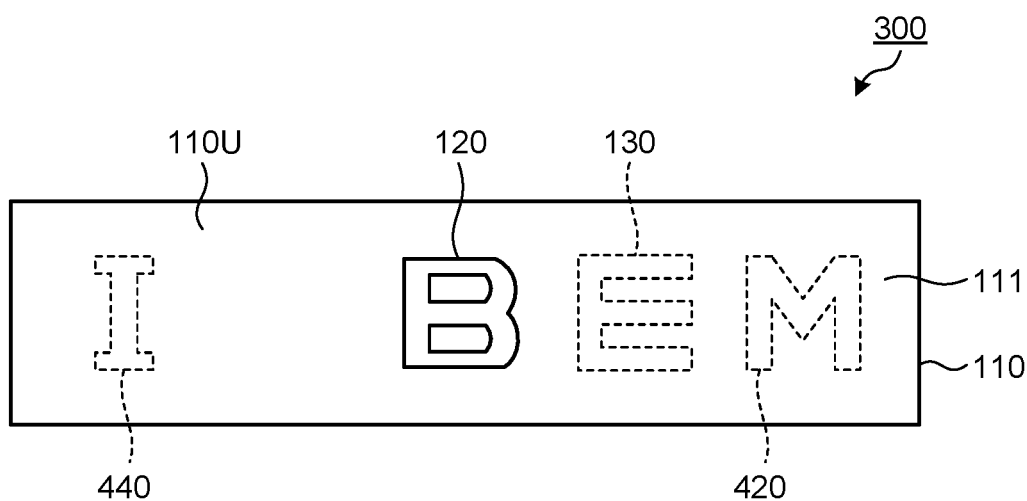
FIG. 14 is a plan view schematically illustrating an image which can be visually recognized when the display set illustrated in FIG. 11 is observed from above in the drawing.

FIG. 14 is a plan view schematically illustrating an image which can be visually recognized when the display set 300 illustrated in FIG. 11 is observed from above in the drawing. As illustrated in FIG. 14, the first reflective layer 120 and the second reflective layer 130 of the display medium 100 and the first display layer 420 and the third display layer 440 of the display article 400 appear in the image visually recognized by the observer who has observed the display set 300 as described above. However, the second display layer 430 of the display article 400 does not appear. In the image visually recognized, the first reflective layer 120 exhibits a color that is a mixture of the hue of the first reflective pigment 121 and the hue of the second reflective pigment 122. The second reflective layer 130 exhibits a color that is either the hue of the first reflective pigment 131 or the hue of the second reflective pigment 132. The first display layer 420 exhibits a color that is either the hue of the first display pigment 421 or the hue of the second display pigment 422. The third display layer 440 exhibits a color of the hue of the fourth display pigment 441. The mechanism for visually recognizing such an image is as follows.

When the display medium 100 is irradiated with irradiation light from above in the drawing in the aspect illustrated in FIG. 11, part of the circularly polarized light of the irradiation light is reflected by the polarized light separation layer 111, and light, other than the reflected circularly polarized light, is incident onto the display article 400. In this manner, part or the entirety of the light which is incident onto the display article 400 is circularly polarized light having the opposite rotation direction to the rotation direction $D_A$ of the circularly polarized light that is to be reflected by the polarized light separation layer 111 (see the light $L_{T1}$, $L_{T3}$, and $L_{T5}$ of FIG. 4).

The first display layer 420 of the display article 400 includes the first display pigment 421 capable of reflecting circularly polarized light having the rotation direction $D_{DR}$, and the second display pigment 422 capable of reflecting circularly polarized light having the opposite rotation direction $D_{DL}$ to the rotation direction $D_{DR}$, in combination. The entirety or a large quantity of the light that has been transmitted through the display medium 100 and been incident onto the first display layer 420 is therefore reflected not by one of the first display pigment 421 and the second display pigment 422, but by the other one of the first display pigment 421 and the second display pigment 422. Specifically, the entirety or a large quantity of the light that is incident onto the first display layer 420 is reflected by the display pigment which is one capable of reflecting the circularly polarized light having the opposite rotation direction to the rotation direction $D_A$, among the first display pigment 421 and the second display pigment 422. Since the reflected light is circularly polarized light having the opposite rotation direction to the rotation direction $D_A$, the reflected light is transmitted through the polarized light separation layer 111 of the display medium 100, and accordingly, can be visually recognized by the observer. Therefore, the observer can visually recognize the first display layer 420 which exhibits a color that is either the hue of the first display pigment 421 or the hue of the second display pigment 422 (usually, the hue of the display pigment capable of reflecting the circularly polarized light having the opposite rotation direction to the rotation direction $D_A$ among the first display pigment 421 and the second display pigment 422).

Furthermore, the second display layer 430 of the display article 400 contains the third display pigment 431 capable of reflecting circularly polarized light having the same rotation direction $D_{D3}$ as the rotation direction $D_A$, and transmitting circularly polarized light having an opposite rotation direction to the rotation direction $D_{D3}$, therethrough. Therefore, the entirety or a large quantity of the light that has been transmitted through the display medium 100 and been incident onto the second display layer 430 is not reflected by the second display layer 430 or reflection occurs only slightly. Even if light is reflected by the second display layer 430, since the reflected light is circularly polarized light having the same rotation direction $D_{D3}$ as the rotation direction $D_A$, part or the entirety of the reflected light is reflected by the polarized light separation layer 111 of the display medium 100. Thus, since there is no light or weak light that can be reflected by the second display layer 430 and be transmitted through the display medium 100, the observer cannot visually recognize the image of the second display layer 430.

Furthermore, the third display layer 440 of the display article 400 contains the fourth display pigment 441 capable of reflecting circularly polarized light having an opposite rotation direction $D_{D4}$ to the rotation direction $D_A$, and transmitting circularly polarized light having an opposite rotation direction to the rotation direction $D_{D4}$, therethrough. Therefore, by the third display layer 440, strong reflection of the entirety or a large quantity of the light that has been transmitted through the display medium 100 and been incident onto the third display layer 440 occurs. Since the reflected light is circularly polarized light having the opposite rotation direction $D_{D4}$ to the rotation direction $D_A$, the observer can visually recognize the reflected light that has been transmitted through the polarized light separation layer 111 of the display medium 100. Therefore, the observer can visually recognize the third display layer 440 which exhibits a color of the hue of the fourth display pigment 441.

Furthermore, since the first reflective layer 120 of the display medium 100 is observed by the observer without through the substrate 110, as described in the first embodiment, the observer can visually recognize the first reflective layer 120 which exhibits a color that is a mixture of the hue of the first reflective pigment 121 and the hue of the second reflective pigment 122.

Furthermore, since the second reflective layer 130 of the display medium 100 is observed by the observer through the substrate 110, as described in the first embodiment, the observer can visually recognize the second reflective layer 130 which exhibits a color that is either the hue of the first reflective pigment 131 or the hue of the second reflective pigment 132.

Thus, the observer can visually recognize, as illustrated in FIG. 14, an image of the first reflective layer 120 which exhibits a color that is a mixture of the hue of the first reflective pigment 121 and the hue of the second reflective pigment 122 (character "B"); an image of the second reflective layer 130 which exhibits a color that is either the hue of the first reflective pigment 131 or the hue of the second reflective pigment 132 (character "E"); an image of the first display layer 420 which exhibits a color that is either the hue of the first display pigment 421 or the hue of the second display pigment 422 (character "M"); and an image of the third display layer 440 which exhibits a color of the hue of the fourth display pigment 441 (character "I").

Figure 15:
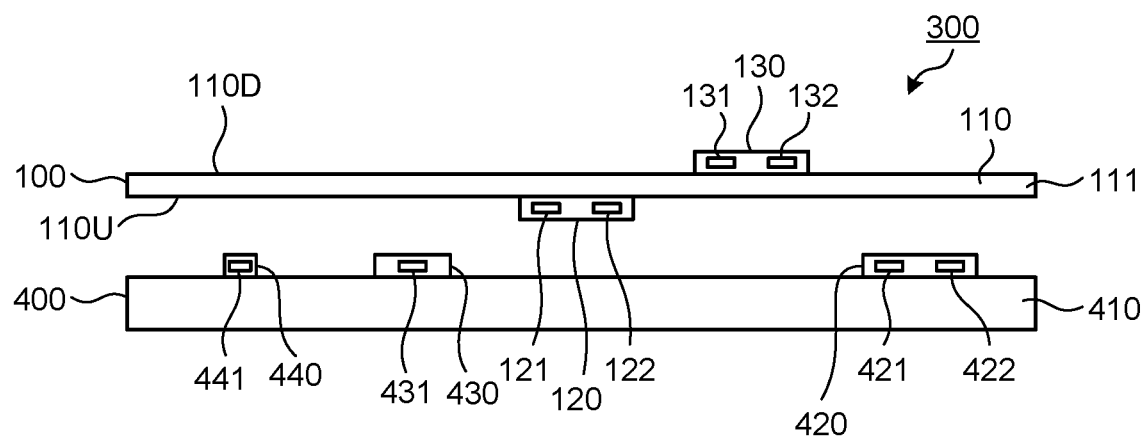
FIG. 15 is a cross-sectional view schematically illustrating the display set according to the third embodiment of the present invention.

Next, a case where the display medium 100 has been turned over will be described. FIG. 15 is a cross-sectional view schematically illustrating a display set 300 according to a third embodiment of the present invention. As illustrated in FIG. 15, in a case where the display medium 100 and the display article 400 are overlapped with each other in a direction where the surface of the display medium 100 on the side with the first reflective layer 120 faces toward the display article 400, an observer usually observes the display set 300 from above in the drawing. Therefore, the observer observes the display medium 100 from the side with the second reflective layer 130 and also simultaneously observes the display article 400 through the display medium 100.

Figure 16:
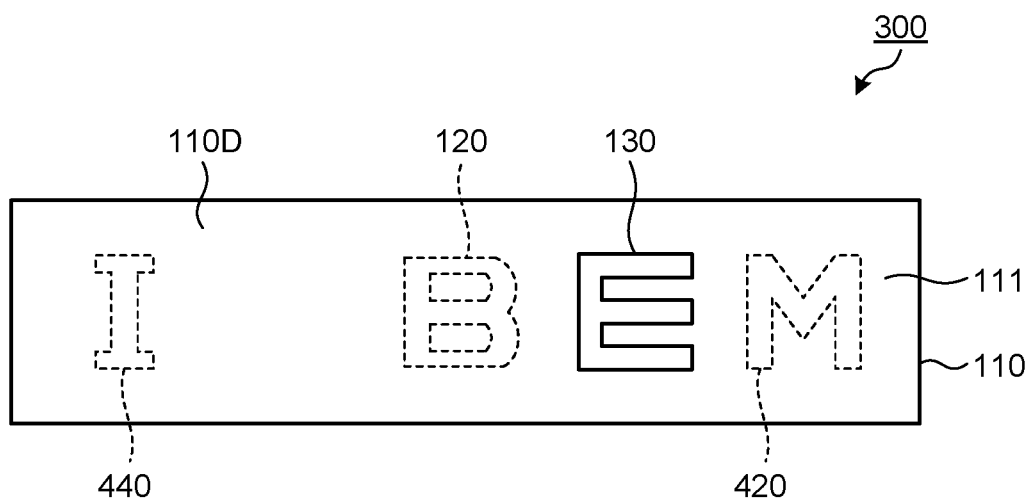
FIG. 16 is a plan view schematically illustrating an image which can be visually recognized when the display set illustrated in FIG. 15 is observed from above in the drawing.

FIG. 16 is a plan view schematically illustrating an image which can be visually recognized when the display set 300 illustrated in FIG. 15 is observed from above in the drawing. As illustrated in FIG. 16, the first reflective layer 120 and the second reflective layer 130 of the display medium 100, and the first display layer 420 and the third display layer 440 of the display article 400 appear in the image visually recognized by the observer who has observed the display set 300 as described above. However, the second display layer 430 of the display article 400 does not appear. In addition, in the image that is visually recognized, the first reflective layer 120 exhibits a color that is either the hue of the first reflective pigment 121 or the hue of the second reflective pigment 122; the second reflective layer 130 exhibits a color that is a mixture of the hue of the first reflective pigment 131 and the hue of the second reflective pigment 132; the first display layer 420 exhibits a color that is either the hue of the first display pigment 421 or the hue of the second display pigment 422; and the third display layer 440 exhibits a color of the hue of the fourth display pigment 441. The mechanism for visually recognizing such an image is as follows.

When the display medium 100 is irradiated with the irradiation light from above in the drawing in the aspect illustrated in FIG. 15, part of the circularly polarized light of the irradiation light is reflected by the polarized light separation layer 111, and light, other than the reflected circularly polarized light, is incident onto the display article 400. In this manner, part or the entirety of the light that is incident onto the display article 400 is circularly polarized light having the opposite rotation direction to the rotation direction $D_A$ of the circularly polarized light that is to be reflected by the polarized light separation layer 111 (see light $L_{T6}$, $L_{T8}$, and $L_{T10}$ in FIG. 5).

Thus, as in a case of observing in the direction illustrated in FIG. 11, the entirety or a large quantity of the light that has been transmitted through the display medium 100 and been incident onto the first display layer 420 is reflected not by one of the first display pigment 421 and the second display pigment 422 but by the other one of the first display pigment 421 and the second display pigment 422. Accordingly, the observer can visually recognize the first display layer 420 which exhibits a color that is either the hue of the first display pigment 421 or the hue of the second display pigment 422.

Also, as in a case of observing in the direction illustrated in FIG. 11, the entirety or a large quantity of the light that has been transmitted through the display medium 100 and been incident onto the second display layer 430 is not reflected by the second display layer 430 or reflection occurs only slightly. Thus, the observer cannot visually recognize the image of the second display layer 430.

Further, as in the case of observing in the direction illustrated in FIG. 11, strong reflection of the entirety or a large quantity of the light that has been transmitted through the display medium 100 and been incident onto the third display layer 440 occurs on the third display layer 440, and thus, the observer can visually recognize the third display layer 440 which exhibits a color of the hue of the fourth display pigment 441.

Furthermore, since the first reflective layer 120 of the display medium 100 is observed by the observer through the substrate 110, as described in the first embodiment, the observer can visually recognize the first reflective layer 120 which exhibits a color that is either the hue of the first reflective pigment 121 or the hue of the second reflective pigment 122.

Furthermore, since the second reflective layer 130 of the display medium 100 is observed by the observer without through the substrate 110, as described in the first embodiment, the observer can visually recognize the second reflective layer 130 which exhibits a color that is a mixture of the hue of the first reflective pigment 131 and the hue of the second reflective pigment 132.

Thus, the observer can visually recognize, as illustrated in FIG. 16, an image of the first reflective layer 120 which exhibits a color that is either the hue of the first reflective pigment 121 or the hue of the second reflective pigment 122 (character "B"); an image of the second reflective layer 130 which exhibits a color that is a mixture of the hue of the first reflective pigment 131 and the hue of the second reflective pigment 132 (character "E"); an image of the first display layer 420 which exhibits a color that is either the hue of the first display pigment 421 or the hue of the second display pigment 422 (character "M"); and an image of the third display layer 440 which exhibits a color of the hue of the fourth display pigment 441 (character "I").

As described above, in the display set 300 according to the present embodiment, it is possible to make an image which can be visually recognized differ depending on the direction of the display medium 100. Therefore, with such a combination of different images, a novel display mode that, as of now, has not yet been achieved, can be achieved, and a complex and highly-flexible design can be produced. In particular, in an environment under irradiation light including both clockwise circularly polarized light and counterclockwise circularly polarized light, although the substrate 110 of the display medium 100 is transparent or semitransparent, the occurrence of a difference in image as described above depending on the direction of the display medium 100 can be an unexpected display for general observers, and therefore, it can be expected that a great impact is given to the observers.

In the third embodiment, the display article 400 including the first display layer 420, the second display layer 430, and the third display layer 440 in combination has been described as an example, but a display article including at least one of the first display layer 420, the second display layer 430 and the third display layer 440 may be used. Furthermore, for example, the display article 400 may include a non-chiral layer provided on the foundation article 410.

6. Fourth Embodiment of Display Set

Although the display medium 100 included in the display set 300 described in the third embodiment does not include a phase difference layer, a display medium including a phase difference layer may be combined with a display article to obtain a display set. In the display set that includes the display medium including a phase difference layer, in general, part or the entirety of the circularly polarized light having the rotation direction $D_D$, which is reflected by the display layer of the display article, can be transmitted through the substrate of the display medium in one order of (i) and (ii) described below, and cannot be transmitted therethrough in the other order.

(i) Order of polarized light separation layer and phase difference layer.

(ii) Order of phase difference layer and polarized light separation layer.

Therefore, according to the display set that includes the display medium including a phase difference layer, utilizing the function of such a display medium can make the image of the display article, which is visually recognized, differ depending on the direction, i.e., the front facing direction or the back facing direction, of the display medium in a different mode from that described in the third embodiment. Hereinafter, an embodiment of such a display set will be described in detail with reference to the drawings.

Figure 17:
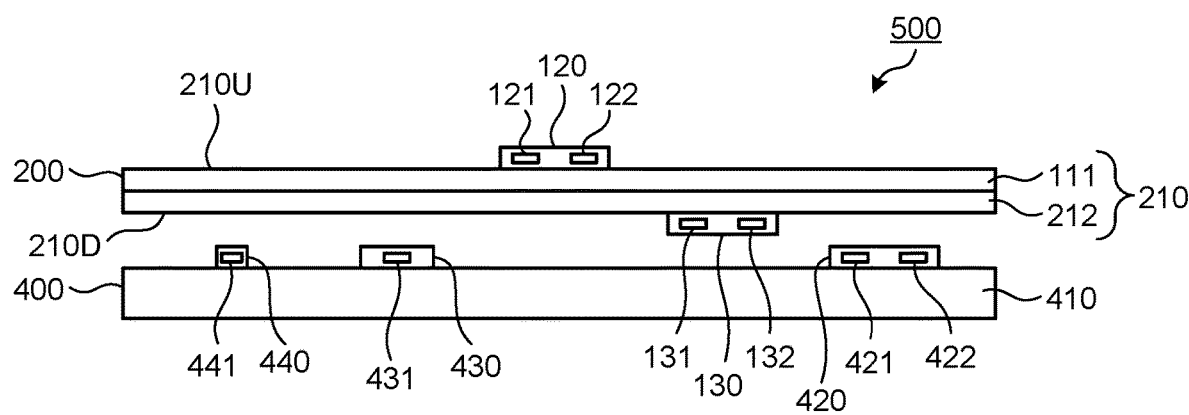
FIG. 17 is a cross-sectional view schematically illustrating a display set according to a fourth embodiment of the present invention.

FIG. 17 is a cross-sectional view schematically illustrating a display set 500 according to a fourth embodiment of the present invention. As illustrated in FIG. 17, the display set 500 according to the fourth embodiment of the present invention includes a display medium 200 and a display article 400. The present embodiment will be described by illustrating the display set 500 including the display medium 200 described in the second embodiment and the display article 400 described in the third embodiment as an example. An observer who observes such a display set 500 can visually recognize an image to be described below.

As illustrated in FIG. 17, a case will be described in which the display medium 200 and the display article 400 are overlapped with each other in a direction where the surface of the display medium 200 on the side with the second reflective layer 130 faces toward the display article 400. In this case, the observer usually observes the display set 500 from above in the drawing. Therefore, the observer observes the display medium 200 from the side with the first reflective layer 120 and also simultaneously observes the display article 400 through the display medium 200.

Figure 18:
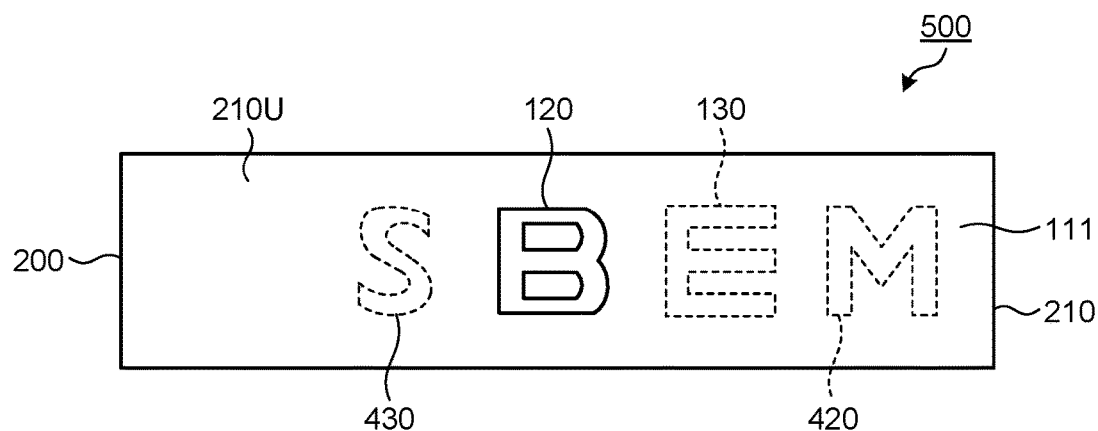
FIG. 18 is a plan view schematically illustrating an image which can be visually recognized when the display set illustrated in FIG. 17 is observed from above in the drawing.

FIG. 18 is a plan view schematically illustrating an image which can be visually recognized when the display set 500 illustrated in FIG. 17 is observed from above in the drawing. As illustrated in FIG. 18, the first reflective layer 120 and the second reflective layer 130 of the display medium 200, and the first display layer 420 and the second display layer 430 of the display article 400 appear in the image visually recognized by the observer who has observed the display set 500 as described above. However, the third display layer 440 of the display article 400 does not appear. In addition, in the image that is visually recognized, the first reflective layer 120 exhibits a color that is a mixture of the hue of the first reflective pigment 121 and the hue of the second reflective pigment 122; the second reflective layer 130 exhibits a color that is either the hue of the first reflective pigment 131 or the hue of the second reflective pigment 132; the first display layer 420 exhibits a color that is either the hue of the first display pigment 421 or the hue of the second display pigment 422; and the second display layer 430 exhibits a color of the hue of the third display pigment 431. The mechanism for visually recognizing such an image is as follows.

When the display medium 200 is disposed to be directed in a direction illustrated in FIG. 17, the polarized light separation layer 111, the phase difference layer 212, and the display article 400 are arranged in this order in the thickness direction of the display medium 200. Therefore, of the irradiation light irradiated on the display medium 200, part of the circularly polarized light is reflected by the polarized light separation layer 111, and light, other than the reflected circularly polarized light, is transmitted through the phase difference layer 212. Then, the light is incident onto the display article 400. In this manner, part or the entirety of the light which is incident onto the displaying article 400 is circularly polarized light having the same rotation direction as the rotation direction $D_A$ of the circularly polarized light reflected by the polarized light separation layer 111 (see the light $L_{T11}$, $L_{T13}$, and $L_{T15}$ of FIG. 9).

The first display layer 420 of the display article 400 includes, in combination, the first display pigment 421 capable of reflecting the circular polarity having the rotation direction $D_{DR}$ and the second display pigment 422 capable of reflecting the circular polarity having the rotation direction $D_{DL}$ that is opposite to the rotation direction $D_{DR}$. The entirety or a large quantity of the light that has been transmitted through the display medium 200 and been incident onto the first display layer 420 is therefore reflected not by one of the first display pigment 421 and the second display pigment 422 but by the other one of the first display pigment 421 and the second display pigment 422. Specifically, the entirety or a large quantity of the light that has been incident onto the first display layer 420 is reflected by the display pigment, of the first display pigment 421 and the second display pigment 422, which can reflect the circularly polarized light having the same rotation direction as the rotation direction $D_A$. Since the reflected light is circularly polarized light having the same rotation direction as the rotation direction $D_A$, the rotation direction thereof is inverted by transmitting the light through the phase difference layer 212 of the display medium 200, and thus, the reflected light is transmitted through the polarized light separation layer 111, and can be visually recognized by the observer. Therefore, the observer can visually recognize the first display layer 420 which exhibits a color that is either the hue of the first display pigment 421 or the hue of the second display pigment 422 (usually, the hue of the display pigment capable of reflecting the circularly polarized light having the same rotation direction as the rotation direction $D_A$ among the first display pigment 421 and the second display pigment 422)).

Furthermore, the second display layer 430 of the display article 400 contains the third display pigment 431 capable of reflecting circularly polarized light having the same rotation direction $D_{D3}$ as the rotation direction $D_A$, and transmitting circularly polarized light having an opposite rotation direction to the rotation direction $D_{D3}$, therethrough. Therefore, by the second display layer 430, strong reflection of the entirety or a large quantity of the light that has been transmitted through the display medium 200 and been incident onto the second display layer 430 occurs. Since the reflected light is circularly polarized light having the same rotation direction $D_{D3}$ as the rotation direction $D_A$, the rotation direction thereof is inverted by transmitting the light through the phase difference layer 212 of the display medium 200. Thus, the reflected light is transmitted through the polarized light separation layer 111, and the observer can visually recognize the light. Therefore, the observer can visually recognize the second display layer 430 which exhibits a color of the hue of the third display pigment 431.

Furthermore, the third display layer 440 of the display article 400 contains the fourth display pigment 441 capable of reflecting circularly polarized light having the opposite rotation direction $D_{D4}$ to the rotation direction $D_A$, and transmitting circularly polarized light having an opposite rotation direction to the rotation direction $D_{D4}$, therethrough. Therefore, the entirety or a large quantity of the light that has been transmitted through the display medium 200 and been incident onto the third display layer 440 is not reflected by the third display layer 440 or reflection occurs only slightly. Even if light is reflected by the third display layer 440, since the reflected light is circularly polarized light having the opposite rotation direction $D_{D4}$ to the rotation direction $D_A$, the rotation direction thereof is inverted by transmitting the reflected light through the phase difference layer 212 of the display medium 200, and part or the entirety of the light is reflected by the polarized light separation layer 111. Therefore, since there is no or weak light that can be reflected by the third display layer 440 and be transmitted through the display medium 200, the observer cannot visually recognize the image of the third display layer 440.

Furthermore, since the first reflective layer 120 of the display medium 200 is observed by the observer without through the substrate 210, as described in the second embodiment, the observer can visually recognize the first reflective layer 120 which exhibits a color that is a mixture of the hue of the first reflective pigment 121 and the hue of the second reflective pigment 122.

Furthermore, since the second reflective layer 130 of the display medium 200 is observed by the observer through the substrate 210, as described in the second embodiment, the observer can visually recognize the second reflective layer 130 which exhibits a color that is either the hue of the first reflective pigment 131 or the hue of the second reflective pigment 132.

Thus, the observer can visually recognize, as illustrated in FIG. 18, an image of the first reflective layer 120 which exhibits a color that is a mixture of the hue of the first reflective pigment 121 and the hue of the second reflective pigment 122 (character "B"); an image of the second reflective layer 130 which exhibits a color that is either the hue of the first reflective pigment 131 or the hue of the second reflective pigment 132 (character "E"); an image of the first display layer 420 which exhibits a color that is either the hue of the first display pigment 421 or the hue of the second display pigment 422 (character "M"); and an image of the second display layer 430 which exhibits a color of the hue of the third display pigment 431 (character "S").

Figure 19:
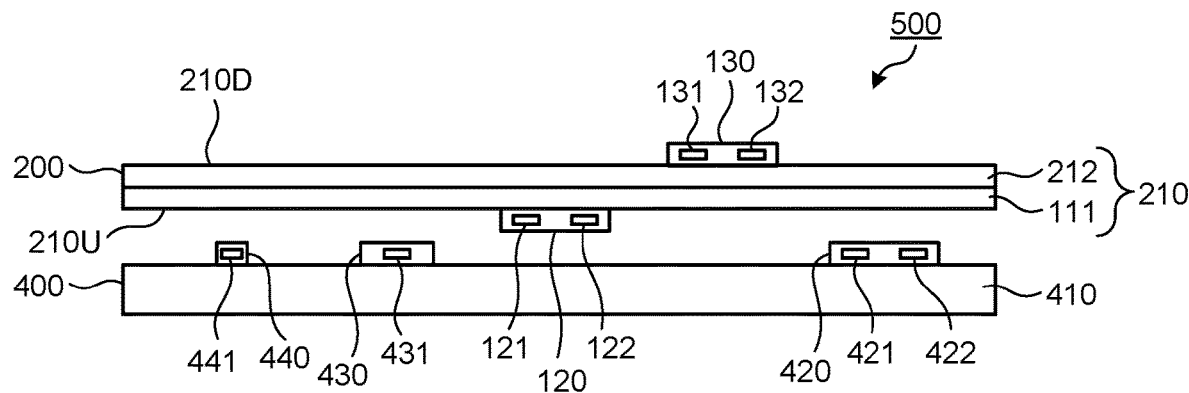
FIG. 19 is a cross-sectional view schematically illustrating the display set according to the fourth embodiment of the present invention.

Next, a case where the display medium 200 has been turned over will be described. FIG. 19 is a cross-sectional view schematically illustrating a display set 500 according to a fourth embodiment of the present invention. As illustrated in FIG. 19, in a case where the display medium 200 and the display article 400 are overlapped with each other in a direction where the surface of the display medium 200 on the side with the first reflective layer 120 faces toward the display article 400, the observer usually observes the display set 500 from above in the drawing. Therefore, the observer observes the display medium 200 from the side with the second reflective layer 130 and also simultaneously observes the display article 400 through the display medium 200.

Figure 20:
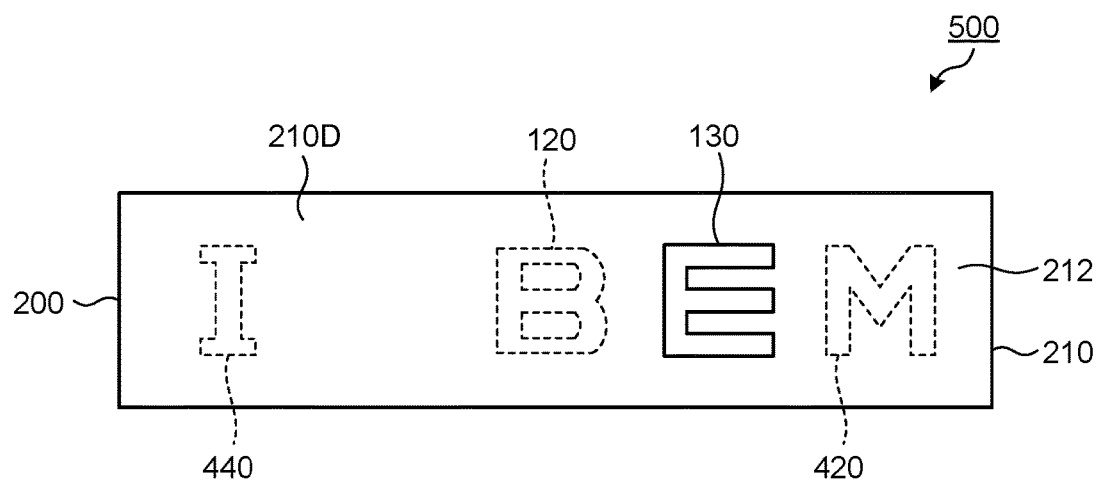
FIG. 20 is a plan view schematically illustrating an image which can be visually recognized when the display set illustrated in FIG. 19 is observed from above in the drawing.

FIG. 20 is a plan view schematically illustrating an image which can be visually recognized when the display set 500 illustrated in FIG. 19 is observed from above in the drawing. As illustrated in FIG. 20, the first reflective layer 120 and the second reflective layer 130 of the display medium 200, and the first display layer 420 and the third display layer 440 of the display article 400 appear in the image visually recognized by the observer who has observed the display set 500 as described above. However, the second display layer 430 of the display article 400 does not appear. In addition, in the image that is visually recognized, the first reflective layer 120 exhibits a color that is either the hue of the first reflective pigment 121 or the hue of the second reflective pigment 122; the second reflective layer 130 exhibits a color that is a mixture of the hue of the first reflective pigment 131 and the hue of the second reflective pigment 132; the first display layer 420 exhibits a color that is either the hue of the first display pigment 421 or the hue of the second display pigment 422; and the third display layer 440 exhibits a color of the hue of the fourth display pigment 441. The mechanism for visually recognizing such an image is as follows.

When the display medium 200 is disposed to be directed in a direction illustrated in FIG. 19, the phase difference layer 212, the polarized light separation layer 111, and the display article 400 are arranged in this order in the thickness direction of the display medium 200. Therefore, the irradiation light irradiated onto the display medium 200 is transmitted through the phase difference layer 212, and part of the circularly polarized light is reflected by the polarized light separation layer 111. Then, the light is incident onto the display article 400. In this manner, the part or the entirety of the light which is incident onto the display article 400 is circularly polarized light having the opposite rotation direction to the rotation direction $D_A$ of the circularly polarized light reflected by the polarized light separation layer 111 (see the light $L_{T16}$, $L_{T18}$, and $L_{T20}$ in FIG. 10).

Thus, the entirety or a large quantity of the light that has been transmitted through the display medium 200 and been incident onto the first display layer 420 is reflected not by one of the first display pigment 421 and the second display pigment 422 but by the other one of the first display pigment 421 and the second display pigment 422. Specifically, the entirety or a large quantity of the light that is incident onto the first display layer 420 is reflected by the display pigment which is one capable of reflecting the circularly polarized light having the opposite rotation direction to the rotation direction $D_A$, among the first display pigment 421 and the second display pigment 422. Therefore, the observer can visually recognize the first display layer 420 which exhibits a color that is either the hue of the first display pigment 421 or the hue of the second display pigment 422 (usually, the hue of the display pigment capable of reflecting the circularly polarized light having the opposite rotation direction to the rotation direction $D_A$ among the first display pigment 421 and the second display pigment 422).

Furthermore, the second display layer 430 of the display article 400 contains the third display pigment 431 capable of reflecting circularly polarized light having the same rotation direction $D_{D3}$ as the rotation direction $D_A$, and transmitting circularly polarized light having an opposite rotation direction to the rotation direction $D_{D3}$, therethrough. Therefore, the entirety or a large quantity of the light that has been transmitted through the display medium 200 and been incident onto the second display layer 430 is not reflected by the second display layer 430 or reflection occurs only slightly. Even if light is reflected by the second display layer 430, since the reflected light is circularly polarized light having the same rotation direction $D_{D3}$ as the rotation direction $D_A$, part or the entirety of the reflected light is reflected by the polarized light separation layer 111 of the display medium 200. Thus, since there is no light or weak light that can be reflected by the second display layer 430 and be transmitted through the display medium 200, the observer cannot visually recognize the image of the second display layer 430.

Furthermore, the third display layer 440 of the display article 400 contains the fourth display pigment 441 capable of reflecting circularly polarized light having an opposite rotation direction $D_{D4}$ to the rotation direction $D_A$, and transmitting circularly polarized light having an opposite rotation direction to the rotation direction $D_{D4}$, therethrough. Therefore, on the third display layer 440, strong reflection of the entirety or a large quantity of the light that has been transmitted through the display medium 200 and been incident onto the third display layer 440 occurs. Since the reflected light is circularly polarized light having the opposite rotation direction $D_{D4}$ to the rotation direction $D_A$, the reflected light is transmitted through the polarized light separation layer 111 of the displaying medium 200 and further through the phase difference layer 212, so that the observer can visually recognize the reflected light. Therefore, the observer can visually recognize the third display layer 440 which exhibits a color of the hue of the fourth display pigment 441.

Furthermore, since the first reflective layer 120 of the display medium 200 is observed by the observer through the substrate 210, as described in the second embodiment, the observer can visually recognize the first reflective layer 120 which exhibits a color that is either the hue of the first reflective pigment 121 or the hue of the second reflective pigment 122.

Furthermore, since the second reflective layer 130 of the display medium 200 is observed by the observer without through the substrate 210, as described in the second embodiment, the observer can visually recognize the second reflective layer 130 which exhibits a color that is a mixture of the hue of the first reflective pigment 131 and the hue of the second reflective pigment 132.

Thus, the observer can visually recognize, as illustrated in FIG. 20, an image of the first reflective layer 120 which exhibits a color that is either the hue of the first reflective pigment 121 or the hue of the second reflective pigment 122 (character "B"); an image of the second reflective layer 130 which exhibits a color that is a mixture of the hue of the first reflective pigment 131 and the hue of the second reflective pigment 132 (character "E"); an image of the first display layer 420 which exhibits a color that is either the hue of the first display pigment 421 or the hue of the second display pigment 422 (character "M"); and an image of the third display layer 440 which exhibits a color of the hue of the fourth display pigment 441 (character "I").

As described above, in the display set 500 according to the present embodiment, an image which can be visually recognized can differ depending on the direction of the display medium 200. In particular, in the display set 500 according to the present embodiment, the image of the first display layer 420 of the display article 400 to be observed and visually recognized from the side with the first reflective layer 120 of the display medium 200 exhibits one hue of the first display pigment 421 and the second display pigment 422. On the contrary, the image of the first display layer 420 of the display article 400 to be observed and visually recognized from the side with the second reflective layer 130 of the display medium 200 exhibits the other one of the hue of the first display pigment 421 and that of the second display pigment 422. Thus, in the display set 500 of the present embodiment, the hue of the first display layer 420 to be visually recognized can be switched between the hue of the first display pigment 421 and the hue of the second display pigment 422 according to the direction of the display medium 200.

In the display set 500 according to the present embodiment, the second display layer 430 appears in the image of the display article 400 to be observed and visually recognized from the side with the first reflective layer 120 of the display medium 200 while the third display layer 440 does not appear in the image. On the contrary, the second display layer 430 does not appear in the image of the display article 400 to be observed and visually recognized from the side with the second reflective layer 130 of the display medium 200 while the third display layer 440 appears in the image. As described above, in the display set 500 of the present embodiment, the display layer to be visually recognized can be switched between the second display layer 430 and the third display layer 440 according to the direction of the display medium 200.

Therefore, with the display set 500 according to the fourth embodiment, the same advantage as that of the display set 300 according to the third embodiment can be obtained, and furthermore, a more complex and more highly-flexible design than that of the display set 300 according to the third embodiment can be produced.

The display set 500 according to the fourth embodiment may be modified and implemented in the same manner as the display set 300 according to the third embodiment. Further, in the display set 500 according to the fourth embodiment, the display medium 200 may not be provided with a reflective layer such as the first reflective layer 120 and the second reflective layer 130.

EXAMPLE

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed under the conditions of normal temperature and normal pressure in the atmosphere, unless otherwise specified.

In the following description, a transparent tackiness agent tape "LUCIACS CS9621T" (with a thickness of 25 μm, a visible-light transmittance of 90% or more, and an in-plane retardation of 3 nm or less) manufactured by Nitto Denko Corp. was used as the tackiness agent unless otherwise specified.

[Method for Measuring Wavelength Range Over which Layer of Cholesteric Resin can Exhibit Circularly Polarized Light Separation Function]

A layer of a cholesteric resin of a multilayered film was bonded to a black PET film with a tacky layer (manufactured by Tomoegawa Co., Ltd.) via the tacky layer. Subsequently, a supporting film was removed to obtain a sample film. The reflection spectrum of the layer of the cholesteric resin in this sample film was measured at an incidence angle of 5° using a spectrophotometer ("V570" manufactured by JASCO Corporation). From the obtained reflection spectrum, a wavelength range over which the circularly polarized light separation function can be exhibited, as well as a center wavelength and a wavelength width of the wavelength range were determined. Specifically, a peak having a maximum strength, as the maximum reflectivity, of 35% to 50% was identified in the reflection spectrum. Subsequently, a base indicating the minimum strength of the reflection spectrum and a peak top of the aforementioned peak indicating the maximum strength were identified, and a wavelength range indicating a strength equal to or more than "the minimum strength+(the maximum strength−the minimum strength)/2" was obtained as a wavelength range over which the circularly polarized light separation function can be exhibited. Moreover, the average value (($\lambda$1+$\lambda$2)/2) of the minimum wavelength $\lambda$1 and the maximum wavelength $\lambda$2 in this wavelength range was calculated as a center wavelength of the aforementioned wavelength range. Furthermore, a difference between the minimum wavelength $\lambda$1 and the maximum wavelength $\lambda$2 in this wavelength range was calculated as a wavelength width of the aforementioned wavelength range.

[Measurement of Twisting Direction of Cholesteric Resin Contained in Pigment]

A layer of a cholesteric resin for producing a pigment was irradiated with unpolarized light, and the resultant reflected light was observed via a clockwise circular polarizing plate and a counterclockwise circular polarizing plate. Based on the observation, whether the reflected light was clockwise circularly polarized light or counterclockwise circularly polarized light was identified. When the reflected light by the pigment was clockwise circularly polarized light, the twisting direction of the cholesteric resin contained in the pigment was determined as a clockwise twist. When the reflected light by the pigment was counterclockwise circularly polarized light, the twisting direction of the cholesteric resin contained in the pigment was determined as a counterclockwise twist.

[Measurement of Average Particle Diameter of Pigment]

The particle diameter distribution of each pigment was measured using a laser scattering method, and the average particle diameter was measured from the particle diameter distribution. A laser diffraction/scattering type particle diameter distribution measurement device (LA-960 manufactured by Horiba Ltd.) was used as a measurement device.

[Evaluations on Hues of Pigments]

The pigments were each visually observed under natural light to evaluate what kind of hue can be visually recognized.

[Method for Measuring In-Plane Retardation]

In-plane retardations were measured at a measurement wavelength of 590 nm using a phase difference meter ("Axoscan" manufactured by Axometrics, Inc).

Production Example 1: Production of Layer of Cholesteric Resin Capable of Reflecting Clockwise Circularly Polarized Light 100 parts of a photopolymerizable liquid crystal compound represented by the following formula (X1); 25 parts of a photopolymerizable non-liquid crystal compound represented by the following formula (X2); 8 parts of a chiral agent ("LC756" manufactured by BASF Co.); 5 parts of a photopolymerization initiator ("IRGACURE 907" manufactured by Ciba Japan Co.); 0.15 parts of a surfactant ("S-420" manufactured by AGC Seimi Chemical Co.); 130 parts of cyclopentanone and 190 parts of 1,3-dioxolane as solvents were mixed to prepare a liquid crystal composition.

[Chemical formula 1]

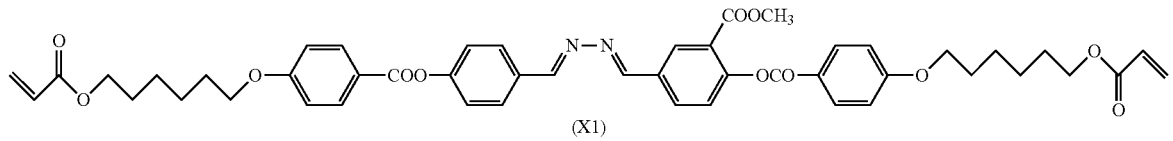

(X1)

[Chemical formula 2]

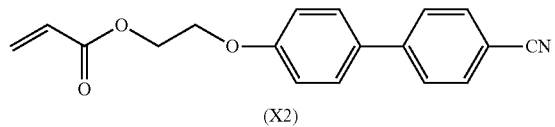

(X2)

A long-length polyethylene terephthalate film ("A4100" manufactured by Toyobo Co., Ltd.; a thickness of 100 μm) was prepared as a supporting film. This supporting film was mounted to a feed unit of a film conveying device, and the following operations were performed with the supporting film being conveyed in a long-length direction.

A surface of the supporting film was subjected to a rubbing treatment in the long-length direction parallel to the conveying direction. Subsequently, a liquid crystal composition was applied onto the surface of the supporting film having undergone the rubbing treatment using a die coater to form a layer of the liquid crystal composition. The layer of the liquid crystal composition was subjected to an orientation treatment by heating at 120° C. for four minutes. Subsequently, the layer of the liquid crystal composition was subjected to a bandwidth broadening treatment. In this bandwidth broadening treatment, weak ultraviolet light irradiation at 5 mJ/cm² to 30 mJ/cm² and a heating treatment at 100° C. to 120° C. were alternately repeated multiple times factured by ZEON Corporation; a film produced by extrusion molding. An unstretched product) was prepared. This resin film was stretched in one direction by 3.9 times at a stretching temperature of 130° C. to obtain a phase difference film. The thickness of this phase difference film was 38 μm, and the in-plane retardation thereof was 280 nm.

Production Example 3: Production of Pigment Containing Flakes of Cholesteric Resin A liquid crystal compound (X3) represented by the following formula (X3); a compound (X4) represented by the following formula (X4); "LC756" as a chiral agent, manufactured by BASF Co.; a compound (X5) as a chiral agent, represented by the following formula (X5); "IRGACURE 184" as a polymerization initiator, manufactured by BASF Co.; "Surflon S420" as a leveling agent, manufactured by AGC Seimi Chemical Co., Ltd.; and cyclopentanone as a solvent are mixed according to amounts shown in the following Table 1 to prepare a liquid crystal composition.

[Chemical formula 3]

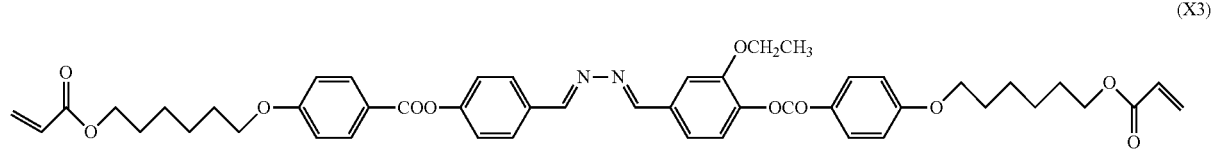

(X3)

[Chemical formula 4]

(X4)

[Chemical formula 5]

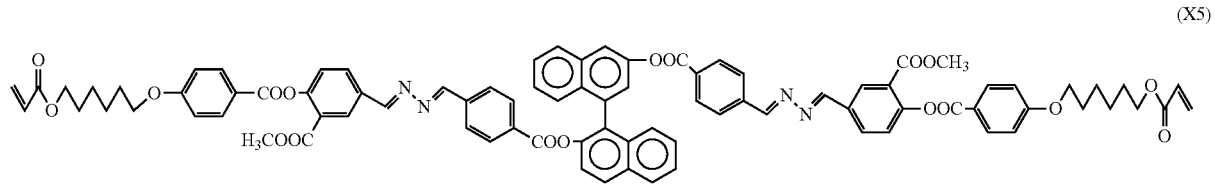

(X5)

to control the reflection bandwidth to a desired bandwidth. Subsequently, the layer of the liquid crystal composition was irradiated with ultraviolet light at 800 mJ/cm², whereby the layer of the liquid crystal composition was cured. Consequently, a multilayered film including the supporting film and the layer of the cholesteric resin was obtained. A polarized light separation wavelength range over which the layer of the cholesteric resin of this multilayered film can exhibit the circularly polarized light separation function was measured using the aforementioned measurement method. As the result of the measurement, the layer of the cholesteric resin had a polarized light separation wavelength range having a maximum reflectivity of 40% or more for unpolarized light in a wavelength range of 450 nm to 700 nm.

Production Example 2: Production of Phase Difference Film

A resin film containing a norbornene-base polymer as a polymer having a cyclic structure ("ZEONOR film" manu- A polyethylene terephthalate (PET) film ("COSMOSHINE (registered trademark) A4100" manufactured by Toyobo Co., Ltd., a thickness of 100 μm) was prepared as the supporting film, and one surface thereof was subjected to a rubbing treatment. The liquid crystal composition was applied onto the surface of the supporting film having undergone the rubbing treatment to form a layer of the liquid crystal composition. The application liquid was applied using a die coater with a discharge amount being adjusted so that a film thickness of the layer of the liquid crystal composition before being dried was 15 μm.

Subsequently, the layer of the liquid crystal composition formed on the supporting film was heated in an oven at 140° C. for two minutes to conduct a drying treatment and an orientation treatment.

After that, the product was irradiated with ultraviolet light using a high-pressure mercury lamp from the side with the layer of the liquid crystal composition to cure the layer of the liquid crystal composition. Ultraviolet irradiation conditions were set as follows: under a nitrogen gas atmosphere; an illuminance of 280 mW/cm² at a wavelength of 365 nm; and an exposure amount of 2300 mJ/cm² at a wavelength of 365 nm. A multilayered film including the supporting film and a layer of the cholesteric resin was thus obtained. The thickness of the layer of the cholesteric resin was 3 μm. The wavelength range over which the thus obtained layer of the cholesteric resin can exhibit the circularly polarized light separation function, and the twisting direction of the cholesteric resin were measured using the aforementioned measurement methods.

The layer of the cholesteric resin was peeled from the supporting film, and pulverized to obtain flakes of the cholesteric resin. The obtained flakes were classified with a sieve. Only flakes having been transmitted through the sieve were collected to obtain pigments I to V. The average particle diameters and hues of the thus obtained pigments were evaluated using the aforementioned methods. The results are shown in the following Table 1. In Table 1, the "center wavelength", the "wavelength range", and the "width of wavelength range" refer to the center wavelength of the wavelength range over which that pigment can exhibit the circularly polarized light separation function, the wavelength range over which that pigment can exhibit the circularly polarized light separation function, and the width of the wavelength range over which that pigment can exhibit the circularly polarized light separation function, respectively.

Production Example 5: Production of Ink GR 5 parts of the pigment III as a green pigment that is capable of reflecting clockwise circularly polarized light; 5 parts of the pigment II as a red pigment that is capable of reflecting counterclockwise circularly polarized light; 85 parts of a screen ink ("No. 2500 medium" manufactured by Jujo Chemical Co., Ltd.); and 5 parts of a diluent (tetrone standard solvent) dedicated to that screen ink were mixed to obtain an ink GR. The mixed color of the hue of the pigment III and the hue of the pigment II contained in this ink GR is yellow.

Production Example 6: Production of Ink BR 5 parts of the pigment V as a blue pigment that is capable of reflecting clockwise circularly polarized light; 5 parts of the pigment II as a red pigment that is capable of reflecting counterclockwise circularly polarized light; 85 parts of a screen ink ("No. 2500 medium" manufactured by Jujo Chemical Co., Ltd.); and 5 parts of a diluent (tetrone standard solvent) dedicated to that screen ink were mixed to obtain an ink BR. The mixed color of the hue of the pigment V and the hue of the pigment II contained in this ink BR is reddish purple.

TABLE 1

[Composition of Liquid Crystal Compositions and Evaluation Results of Pigments produced from Liquid Crystal Compositions]

| Pigment | I | II | III | IV | V |
| --- | --- | --- | --- | --- | --- |
| liquid crystal composition | | | | | |
| liquid crystal compound (X3) [part by weight] | 16.2 | 16.2 | 16.0 | 15.9 | 15.8 |
| compound (X4) [part by weight] | 4.1 | 4.1 | 4.0 | 4.0 | 4.0 |
| chiral agent LC756 [part by weight] | 1.1 | — | 1.3 | — | 1.6 |
| chiral agent Compound (X5) [part by weight] | — | 1.1 | — | 1.5 | — |
| polymerization initiator IRGACURE184 [part by weight] | 0.66 | 0.66 | 0.66 | 0.66 | 0.66 |
| leveling agent Surfion S420 [part by weight] | 0.04 | 0.04 | 0.04 | 0.04 | 0.04 |
| cyclopentanone [part by weight] | 78.0 | 78.0 | 78.0 | 78.0 | 78.0 |
| evaluation of pigment | | | | | |
| center wavelength [nm] | 636 | 625 | 542 | 540 | 459 |
| wavelength range [nm] | 579-693 | 576-660 | 489-594 | 506-574 | 408-509 |
| width of wavelength range [nm] | 114 | 84 | 105 | 68 | 101 |
| average particle diameter [μm] | 45 | 45 | 45 | 45 | 45 |
| twisting direction | clockwise | counterclockwise | clockwise | counterclockwise | clockwise |
| hue | red | red | green | green | blue |

Production Example 4: Production of Ink RG 5 parts of the pigment I as a red pigment that is capable of reflecting clockwise circularly polarized light; 5 parts of the pigment IV as a green pigment that is capable of reflecting counterclockwise circularly polarized light; 85 parts of a screen ink ("No. 2500 medium" manufactured by Jujo Chemical Co., Ltd.); and 5 parts of a diluent (tetrone standard solvent) dedicated to that screen ink were mixed to obtain an ink RG. The mixed color of the hue of the pigment I and the hue of the pigment IV contained in this ink RG is yellow.

Example 1

(Brief Description of Display Set)

Figure 21:
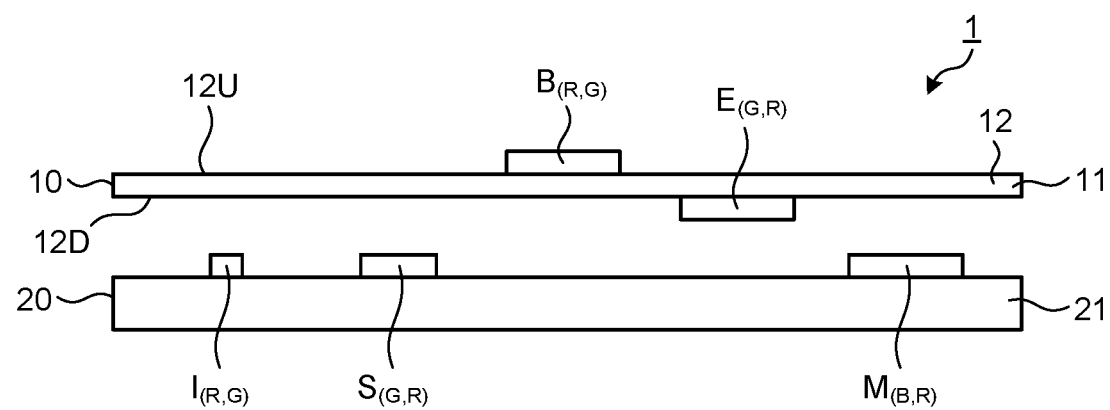
FIG. 21 is a cross-sectional view schematically illustrating a display set produced in Example 1.

FIG. 21 is a cross-sectional view schematically illustrating a display set 1 produced in Example 1. As illustrated in FIG. 21, the display set 1 produced in Example 1 includes a display medium 10, and a display article 20. The display medium 10 includes: a substrate 12 including a polarized light separation layer 11; a character layer $B_{(R,G)}$ provided on a first surface 12U of the substrate 12 as a first reflective layer; and a character layer $E_{(G,R)}$ provided on a second surface 12D of the substrate 12 as a second reflective layer.

Although the display medium 10 produced in Example 1 included a supporting layer and a tackiness agent, the illustrations thereof are omitted in FIG. 21. The display article 20 includes: a foundation article 21; and a character layer $M_{(B,R)}$, a character layer $S_{(G,R)}$, and a character layer $I_{(R,G)}$ provided on the foundation article 21 as display layers. A method for producing such a display set 1 will be described below.

(Production of Display Medium)

The layer of the cholesteric resin of the multilayered film produced in Production Example 1 and an optically isotropic film (film made of polyvinyl chloride) were bonded to each other via a tackiness agent, and the supporting film of the multilayered film was removed. As a result, the substrate 12 including the supporting layer (not illustrated) serving as an optically isotropic film, the tackiness agent (not illustrated), and the polarized light separation layer 11 serving as a layer of a cholesteric resin, in this order, was thus obtained as illustrated in FIG. 21.

On the first surface 12U of the substrate 12, a character "B" was printed with the ink RG produced in Production Example 4 and then dried to form the character layer $B_{(R,G)}$ as a first reflective layer. Furthermore, on the second surface 12D of the substrate 12, a character "E" was printed with the ink GR produced in Production Example 5, and then dried to form the character layer $E_{(G,R)}$ as a second reflective layer. The display medium 10 was thus obtained which included the character layer $B_{(R,G)}$, the polarized light separation layer 11, and the character layer $E_{(G,R)}$ in this order in the thickness direction thereof.

(Production of Display Article)

On one surface of a black sheet made of a resin, a character "M" was printed with the ink BR produced in Production Example 6, and then dried to form the character layer $M_{(B,R)}$ as a display layer. Also, on the one surface of the black sheet, a character "S" was printed with the ink GR produced in Production Example 5, and then dried to form the character layer $S_{(G,R)}$ as a display layer. Furthermore, on the one surface of the black sheet, a character "I" was printed with the ink RG produced in Production Example 4, and then dried to form the character layer $I_{(R,G)}$ as a display layer. The display article 20 including the character layer $M_{(B,R)}$, the character layer $S_{(G,R)}$, and the character layer $I_{(R,G)}$ on one surface of the foundation article 21 as a black sheet was thus obtained.

(Observation)

The display article 20 was placed on a table (not illustrated) in such a manner that the character layer $M_{(B,R)}$, the character layer $S_{(G,R)}$, and the character layer $I_{(R,G)}$ were directed upward as illustrated in FIG. 21. The display medium 10 was placed on the display article 20 with the character layer $B_{(R,G)}$ being directed upward. The display set 1 consisting of these display medium 10 and display article 20 was observed from above under irradiation with unpolarized light. As a result of the observation, the character layer $B_{(R,G)}$ was visually recognized as yellow, the character layer $E_{(G,R)}$ was visually recognized as red, the character layer $M_{(B,R)}$ was visually recognized as red, the character layer $S_{(G,R)}$ was visually recognized as red, and the character layer $I_{(R,G)}$ was visually recognized as green.

After that, the display medium 10 was turned over and placed again on the display article 20, and the display set 1 was observed again. As a result of observation, the character layer $B_{(R,G)}$ was visually recognized as green, the character layer $E_{(G,R)}$ was visually recognized as yellow, the character layer $M_{(B,R)}$ was visually recognized as red, the character layer $S_{(G,R)}$ was visually recognized as red, and the character layer $I_{(R,G)}$ was visually recognized as green.

The results of Example 1 are combined as shown in the following Table 2.

TABLE 2

[Results of Example 1]

| | character layer in display medium | | | | |
|---|---|---|---|---|---|
| | | $B_{(R, G)}$ | | $E_{(G, R)}$ | |
| | character layer in display article | | | | |
| | $I_{(R, G)}$ | $S_{(G, R)}$ | | | $M_{(B, R)}$ |
| hue in a case of observed from a side with character layer $B_{(R, G)}$ (display medium was set in direction shown in FIG. 21) | green | red | yellow (mixed color) | red | red |
| hue in a case of observed from an opposite side to character layer $B_{(R, G)}$ (display medium was set in an opposite direction to direction shown in FIG. 21) | green | red | green | yellow (mixed color) | red |

Example 2

(Brief Description of Display Set)

Figure 22:
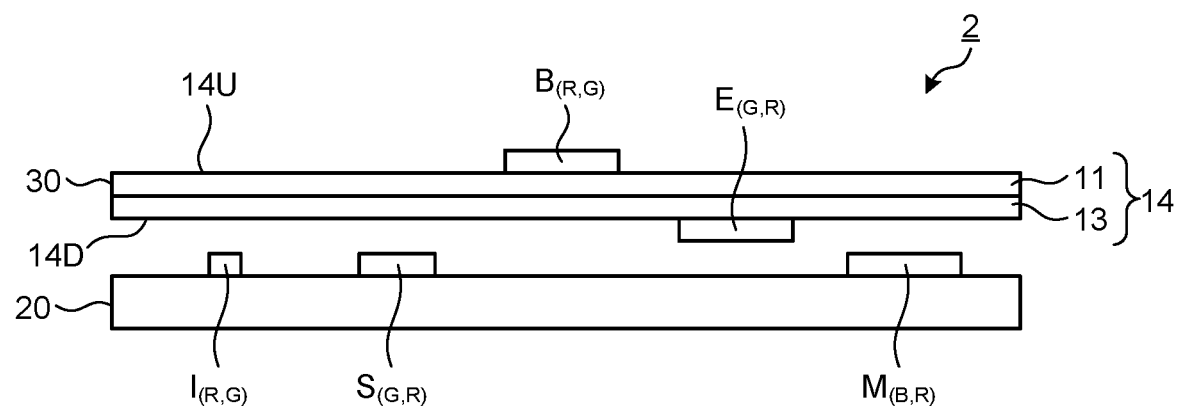
FIG. 22 is a cross-sectional view schematically illustrating a display set produced in Example 2.

FIG. 22 is a cross-sectional view schematically illustrating a display set 2 produced in Example 2. As illustrated in FIG. 22, the display set 2 produced in Example 2 includes a display medium 30, and a display article 20. The display article 20 is the same as that of Example 1. The display medium 30 is the same as the display medium 10 of Example 1 except that the display medium 30 includes a substrate 14, including the phase difference layer 13, instead of the substrate 12. Although the display medium 30 produced in Example 2 included a supporting layer and a tackiness agent, the illustrations thereof are omitted in FIG. 22.

Specifically, the display medium 30 was produced in the following procedure. The layer of the cholesteric resin of the multilayered film produced in Production Example 1 and an optically isotropic supporting film (film made of polyvinyl chloride) were bonded to each other via a tackiness agent, and the supporting film of the multilayered film was removed. The surface of the layer of the cholesteric resin, which appeared by removing the supporting film, and the phase difference film produced in Production Example 2 were bonded to each other via a tackiness agent. As a result, the substrate 14 including the supporting layer (not illustrated) serving as an optically isotropic film, the tackiness agent (not illustrated), the polarized light separation layer 11 serving as a layer of a cholesteric resin layer, the tackiness agent (not illustrated), and the phase difference layer 13 serving as the phase difference film, in this order, was thus obtained as illustrated in FIG. 22.

On the first surface 14U of the substrate 14 as a surface with the polarized light separation layer, a character "B" was printed with the ink RG produced in Production Example 4, and then dried to form the character layer $B_{(R,G)}$ as a first reflective layer. Furthermore, on the second surface 14D of the substrate 14 as a surface with the phase difference layer, a character "E" was printed with the ink GR produced in Production Example 5, and then dried to form the character layer $E_{(G,R)}$ as a second reflective layer. The display medium 30 was thus obtained which included the character layer $B_{(R,G)}$, the polarized light separation layer 11, the phase difference layer 13, and the character layer $E_{(G,R)}$ in this order in the thickness direction thereof.

(Observation)

The display article 20 was placed on a table (not illustrated) in such a manner that the character layer $M_{(B,R)}$, the character layer $S_{(G,R)}$, and the character layer $I_{(R,G)}$ were directed upward as illustrated in FIG. 22. The display medium 30 was placed on the display article 20 with the character layer $B_{(R,G)}$ being directed upward. The display set 2 consisting of these display medium 30 and display article 20 was observed from above under irradiation with unpolarized light. As a result of the observation, the character layer $B_{(R,G)}$ was visually recognized as yellow, the character layer $E_{(G,R)}$ was visually recognized as green, the character layer $M_{(B,R)}$ was visually recognized as blue, the character layer $S_{(G,R)}$ was visually recognized as green, and the character layer $I_{(R,G)}$ was visually recognized as red.

After that, the display medium 30 was turned over and placed again on the display article 20, and the display set 2 was observed again. As a result of the observation, the character layer $B_{(R,G)}$ was visually recognized as green, the character layer $E_{(G,R)}$ was visually recognized as yellow, the character layer $M_{(B,R)}$ was visually recognized as red, the character layer $S_{(G,R)}$ was visually recognized as red, and the character layer $I_{(R,G)}$ was visually recognized as green.

The results of Example 2 are combined as shown in the following Table 3.

TABLE 3

[Results of Example 2]

|  | character layer of display medium | | | | |
|---|---|---|---|---|---|
|  | | $B_{(R, G)}$ | | $E_{(G, R)}$ | |
|  | character layer of display article | | | | |
|  | $I_{(R, G)}$ | $S_{(G, R)}$ | | | $M_{(B, R)}$ |
| hue in a case of observed from a side with character layer $B_{(R, G)}$ (display medium was set in direction shown in FIG. 22) | red | green | yellow (mixed color) | green | blue |
| hue in a case of observed from an opposite side to character layer $B_{(R, G)}$ (display medium was set in an opposite direction to direction shown in FIG. 22) | green | red | green | yellow (mixed color) | red |

The character layer $B_{(G,R)}$ was formed by the same manner as that for the character layer $B_{(R,G)}$ formed in Example 2 except that the ink GR produced in Production Example 5 was used instead of the ink RG.

(Observation)

Figure 23:
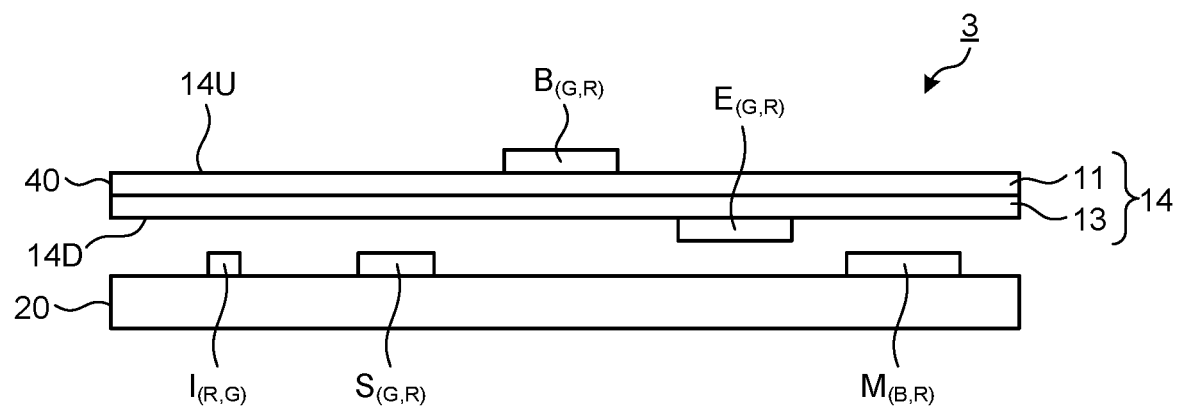
FIG. 23 is a cross-sectional view schematically illustrating a display set produced in Example 3.

The display article 20 was placed on a table (not illustrated) in such a manner that the character layer $M_{(B,R)}$, the character layer $S_{(G,R)}$, and the character layer $I_{(R,G)}$ were directed upward as illustrated in FIG. 23. The display medium 40 was placed on the display article 20 with the character layer $B_{(G,R)}$ being directed upward. The display set 3 consisting of these display medium 40 and display article 20 was observed from above under irradiation with unpolarized light. As a result of the observation, the character layer $B_{(G,R)}$ was visually recognized as yellow, the character layer $E_{(G,R)}$ was visually recognized as green, the character layer $M_{(B,R)}$ was visually recognized as blue, the character layer $S_{(G,R)}$ was visually recognized as green, and the character layer $I_{(R,G)}$ was visually recognized as red.

After that, the display medium 40 was turned over and placed again on the display article 20, and the display set 3 was observed again. As a result of the observation, the character layer $B_{(R,R)}$ was visually recognized as red, the character layer $E_{(G,R)}$ was visually recognized as yellow, the character layer $M_{(B,R)}$ was visually recognized as red, the character layer $S_{(G,R)}$ was visually recognized as red, and the character layer $I_{(R,G)}$ was visually recognized as green.

The results of Example 3 are combined as shown in the following Table 4.

TABLE 4

[Results of Example 3]

|  | character layer of display medium | | | | |
|---|---|---|---|---|---|
|  | | $B_{(G, R)}$ | | $E_{(G, R)}$ | |
|  | character layer of display article | | | | |
|  | $I_{(R, G)}$ | $S_{(G, R)}$ | | | $M_{(B, R)}$ |
| hue in a case of observed from a side with character layer $B_{(G, R)}$ (display medium was set in direction shown in FIG. 23) | red | green | yellow (mixed color) | green | blue |
| hue in a case of observed from an opposite side to character layer $B_{(G, R)}$ (display medium was set in an opposite direction to direction shown in FIG. 23) | green | red | red | yellow (mixed color) | red |

Example 3

(Brief Description of Display Set)

FIG. 23 is a cross-sectional view schematically illustrating a display set 3 produced in Example 3. As illustrated in FIG. 23, the display set 3 produced in Example 3 includes a display medium 40, and a display article 20. The display article 20 is the same as that of Example 1. The display medium 40 is the same as the display medium 30 of Example 2 except that the display medium 40 includes a character layer $B_{(G,R)}$ instead of the character layer $B_{(R,G)}$. Although the display medium 40 produced in Example 3 included a supporting layer and a tackiness agent, the illustrations thereof are omitted in FIG. 23.

Comparative Example 1

(Description of Display Set)

Figure 24:
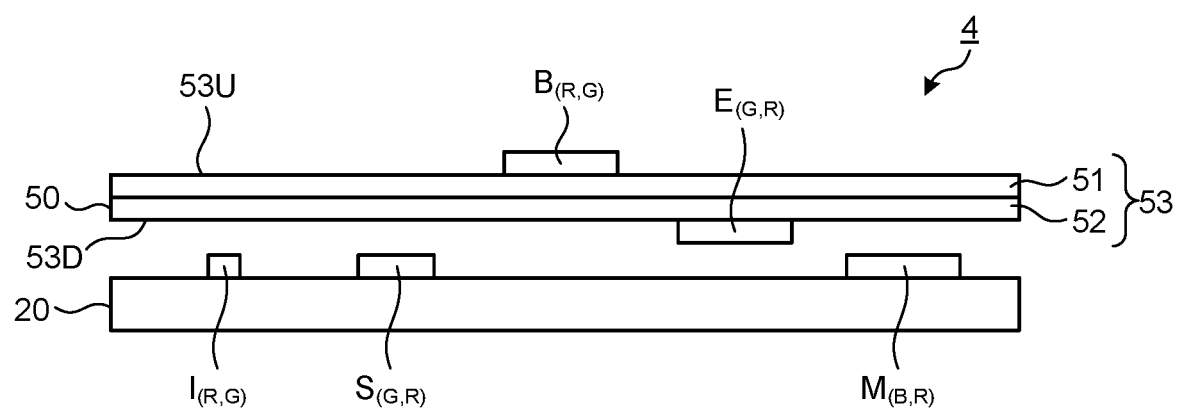
FIG. 24 is a cross-sectional view schematically illustrating a display set produced in Comparative Example 1.

FIG. 24 is a cross-sectional view schematically illustrating a display set 4 produced in Comparative Example 1. As illustrated in FIG. 24, the display set 4 produced in Comparative Example 1 includes a display medium 50, and a display article 20. The display article 20 is the same as that of Example 1. The display medium 50 is the same as the display medium 10 of Example 1 except that the display medium 50 includes a circular polarizing filter 53, which includes a linear polarizer 51 and a quarter-wave plate 52 in combination, instead of the substrate 12. Although the display medium 50 produced in Comparative Example 1 included a supporting layer and a tackiness agent, the illustrations thereof are omitted in FIG. 24.

Specifically, the display medium 50 was produced in the following procedure. The circular polarizing filter 53 was prepared which is described in Example 1 of Japanese Patent No. 5828182 and was slightly blackish. The circular polarizing filter 53 was capable of transmitting clockwise circularly polarized light therethrough and of absorbing counterclockwise circularly polarized light. On a surface 53U of the circular polarizing filter 53 on a side with the linear polarizer 51, a character "B" was printed with the ink RG produced in Production Example 4, and then dried to form the character layer $B_{(R,G)}$. Furthermore, on a surface 53D on a side with the quarter-wave plate 52, a character "E" was printed with the ink GR produced in Production Example 5, and then dried to form the character layer $E_{(G,R)}$. The display medium 50 was thus obtained which included the character layer $B_{(R,G)}$, the circular polarizing filter 53, and the character layer $E_{(G,R)}$ in this order in the thickness direction thereof.

(Observation)

The display article 20 was placed on a table (not illustrated) in such a manner that the character layer $M_{(B,R)}$, the character layer $S_{(G,R)}$, and the character layer $I_{(R,G)}$ were directed upward as illustrated in FIG. 24. The display medium 50 was placed on the display article 20 with the character layer $B_{(R,G)}$ being directed upward. The display set 4 consisting of these display medium 50 and display article 20 was observed from above under irradiation with unpolarized light. As a result of the observation, the character layer $B_{(R,G)}$ was visually recognized as yellow, the character layer $E_{(G,R)}$ was visually recognized as green, the character layer $M_{(B,R)}$ was visually recognized as blue, the character layer $S_{(G,R)}$ was visually recognized as green, and the character layer $I_{(R,G)}$ was visually recognized as red.

After that, the display medium 50 was turned over and placed again on the display article 20, and the display set 4 was observed again. As a result of observation, the character layer $B_{(R,G)}$ was visually recognized as yellow, the character layer $E_{(G,R)}$ was visually recognized as yellow, the character layer $M_{(B,R)}$ was visually recognized as reddish purple, the character layer $S_{(G,R)}$ was visually recognized as yellow, and the character layer $I_{(R,G)}$ was visually recognized as yellow.

The results of Comparative Example 1 are combined as shown in the following Table 5.

Comparative Example 2

(Description of Display Set)

Figure 25:
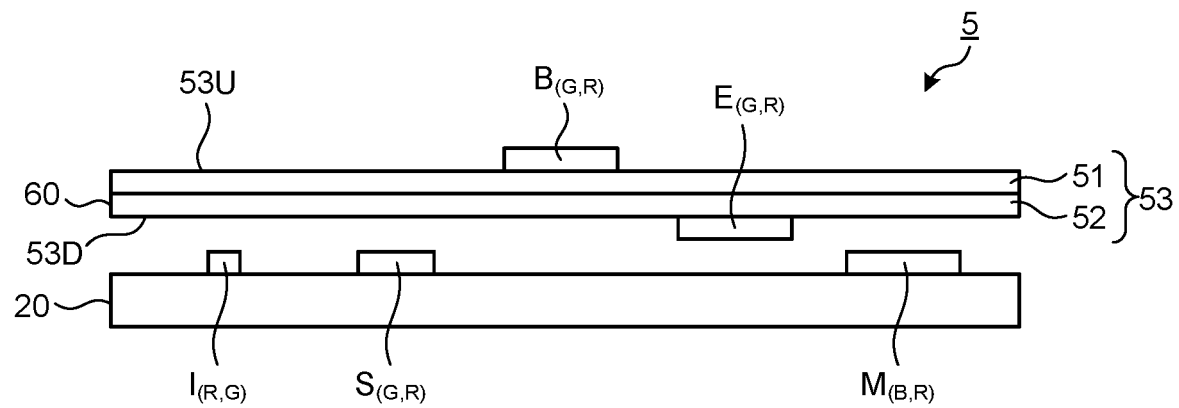
FIG. 25 is a cross-sectional view schematically illustrating a display set produced in Comparative Example 2.

FIG. 25 is a cross-sectional view schematically illustrating a display set 5 produced in Comparative Example 2. As illustrated in FIG. 25, the display set 5 produced in Comparative Example 2 includes a display medium 60, and a display article 20. The display article 20 is the same as that of Example 1. The display medium 60 is the same as the display medium 50 of Comparative Example 1 except that the display medium 60 includes a character layer $B_{(G,R)}$ instead of the character layer $B_{(R,G)}$. Although the display medium 60 produced in Comparative Example 2 included a supporting layer and a tackiness agent, the illustrations thereof are omitted in FIG. 25.

The character layer $B_{(G,R)}$ was formed by the same manner as that for the character layer $B_{(R,G)}$ formed in Comparative Example 1 except that the ink GR produced in Production Example 5 was used instead of the ink RG.

(Observation)

The display article 20 was placed on a table (not illustrated) in such a manner that the character layer $M_{(B,R)}$, the character layer $S_{(G,R)}$, and the character layer $I_{(R,G)}$ were directed upward as illustrated in FIG. 25. The display medium 60 was placed on the display article 20 with the character layer $B_{(G,R)}$ being directed upward. The display set 5 consisting of these display medium 60 and display article 20 was observed from above under irradiation with unpolarized light. As a result of the observation, the character layer $B_{(G,R)}$ was visually recognized as yellow, the character layer $E_{(G,R)}$ was visually recognized as green, the character layer $M_{(B,R)}$ was visually recognized as blue, the character layer $S_{(G,R)}$ was visually recognized as green, and the character layer $I_{(R,G)}$ was visually recognized as red.

After that, the display medium 60 was turned over and placed again on the display article 20, and the display set 5 was observed again. As a result of the observation, the character layer $B_{(G,R)}$ was visually recognized as yellow, the character layer $E_{(G,R)}$ was visually recognized as yellow, the character layer $M_{(B,R)}$ was visually recognized as reddish purple, the character layer $S_{(G,R)}$ was visually recognized as yellow, and the character layer $I_{(R,G)}$ was visually recognized as yellow.

The results of Comparative Example 2 are combined as shown in the following Table 6.

TABLE 5

[Results of Comparative Example 1]

| | character layer of display medium | | | | |
|---|---|---|---|---|---|
| | $B_{(R, G)}$ | | $E_{(G, R)}$ | | |
| | character layer of display article | | | | |
| | $I_{(R, G)}$ | $S_{(G, R)}$ | | | $M_{(B, R)}$ |
| hue in a case of observed from a side with character layer $B_{(R, G)}$ (display medium was set in direction shown in FIG. 24) | red | green | yellow (mixed color) | green | blue |
| hue in a case of observed from an opposite side to character layer $B_{(R, G)}$ (display medium was set in an opposite direction to direction shown in FIG. 24) | yellow (mixed color) | yellow (mixed color) | yellow (mixed color) | yellow (mixed color) | reddish purple (mixed color) |

TABLE 6

[Results of Comparative Example 2]

| | character layer of display medium | | | | |
|---|---|---|---|---|---|
| | $B_{(G, R)}$ | | $E_{(G, R)}$ | | |
| | character layer of display article | | | | |
| | $I_{(R, G)}$ | $S_{(G, R)}$ | | | $M_{(B, R)}$ |
| hue in a case of observed from a side with character layer $B_{(G, R)}$ (display medium was set in direction shown in FIG. 25) | red | green | yellow (mixed color) | green | blue |
| hue in a case of observed from an opposite side to character layer $B_{(G, R)}$ (display medium was set in an opposite direction to direction shown in FIG. 25) | yellow (mixed color) | yellow (mixed color) | yellow (mixed color) | yellow (mixed color) | reddish purple (mixed color) |

REFERENCE SIGN LIST 100 display medium
110 substrate
110U first surface of a substrate
110D second surface of a substrate
111 polarized light separation layer
120 first reflective layer
121 first reflective pigment
122 second reflective pigment
130 second reflective layer
131 first reflective pigment
132 second reflective pigment
200 display medium
210 substrate
210U first surface of substrate
210D second surface of substrate
212 phase difference layer
300 display set
400 display article
410 foundation article
420 first display layer
421 first display pigment
422 second display pigment
430 second display layer
431 third display pigment
440 third display layer
441 fourth display pigment
500 display set

The invention claimed is:

1. A display medium comprising a substrate, and a reflective layer provided on the substrate, wherein:

the substrate includes a polarized light separation layer capable of reflecting circularly polarized light having one rotation direction $D_A$ and transmitting circularly polarized light having an opposite rotation direction to the rotation direction $D_A$ therethrough;

the reflective layer contains a first reflective pigment capable of reflecting circularly polarized light having one rotation direction $D_{BR}$ and transmitting circularly polarized light having an opposite rotation direction to the rotation direction $D_{BR}$ therethrough, and a second reflective pigment capable of reflecting circularly polarized light having one rotation direction $D_{BL}$ and transmitting circularly polarized light having an opposite rotation direction to the rotation direction $D_{BL}$ therethrough;

the rotation direction $D_{BR}$ of the circularly polarized light that the first reflective pigment can reflect is opposite to the rotation direction $D_{BL}$ of the circularly polarized light that the second reflective pigment can reflect;

a hue of the circularly polarized light that the first reflective pigment can reflect and a hue of the circularly polarized light that the second reflective pigment can reflect differ from each other;

the substrate includes a phase difference layer; and an in-plane retardation of the phase difference layer at a measurement wavelength of 590 nm is equal to or more than "$\{(2n+1)/2\} \times 590$ nm$-30$ nm" and equal to or less than "$\{(2n+1)/2\} \times 590$ nm$+30$ nm", wherein n is an integer of 0 or larger.

2. The display medium according to claim 1, wherein a wavelength width of a wavelength range over which the polarized light separation layer can reflect circularly polarized light is 70 nm or wider.

3. The display medium according to claim 1, wherein the polarized light separation layer is a layer of a resin which has cholesteric regularity.

4. The display medium according to claim 1, wherein the first reflective pigment and the second reflective pigment contain a flake of a resin which has cholesteric regularity.

* * * * *